US006629758B2

(12) United States Patent
Okamoto et al.

(10) Patent No.: US 6,629,758 B2

(45) Date of Patent: Oct. 7, 2003

(54) JOINT DEVICE, INK JET RECORDING APPARATUS HAVING THE SAME, AND INK SUPPLYING DEVICE AND METHOD

(75) Inventors: Hideaki Okamoto, Kanagawa (JP); Yohji Ara, Kanagawa (JP); Hiroyuki Inoue, Kanagawa (JP); Hideo Fukazawa, Kanagawa (JP); Tetsuji Kurata, Kanagawa (JP); Hirofumi Hirano, Kanagawa (JP); Hiroshi Netsu, Kanagawa (JP); Masaya Uetsuki, Kanagawa (JP); Hiroki Hayashi, Kanagawa (JP); Noriyasu Asaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/835,327

(22) Filed: Apr. 17, 2001

(65) Prior Publication Data

US 2002/0012030 A1 Jan. 31, 2002

(30) Foreign Application Priority Data

Apr. 19, 2000 (JP) ....................................... 2000-118564
Apr. 24, 2000 (JP) ....................................... 2000-123295

(51) Int. Cl.[7] .......................... B41J 2/175; F16L 29/00; F16K 51/00

(52) U.S. Cl. ....................................... 347/85; 251/149.6

(58) Field of Search ............................ 347/85, 86, 87, 347/49; 251/149.1, 149.6

(56) References Cited

U.S. PATENT DOCUMENTS 4,967,207 A 10/1990 Ruder ........................... 347/7
5,663,754 A 9/1997 Lorenze, Jr. et al. ......... 347/87
5,721,576 A * 2/1998 Barinaga ..................... 347/85
5,745,137 A 4/1998 Scheffelin et al. ............ 347/85
5,980,030 A 11/1999 Fujii ........................... 347/85
5,988,806 A 11/1999 Hall et al. ..................... 347/92
5,992,985 A 11/1999 Young et al. ................. 347/85
6,015,209 A * 1/2000 Barinaga et al. .............. 347/86
6,447,084 B1 * 9/2002 Uetsuki et al. ................ 347/7
6,474,797 B2 * 11/2002 Kurata et al. ................. 347/85
6,540,321 B1 * 4/2003 Hirano et al. ................. 347/22

FOREIGN PATENT DOCUMENTS

EP 676293 10/1995
JP 9-24698 1/1997

OTHER PUBLICATIONS

Application No. 09/839,304, filed Apr. 23, 2001.
Application No. 09/840,165, filed Apr. 24, 2001.
Application No. 09/583,570, filed May 31, 2000.
Application No. 09/580,410, filed May 30, 2000.

* cited by examiner

*Primary Examiner*—Michael Nghiem
(74) *Attorney, Agent, or Firm*—Fitzpatrick, Cella, Harper & Scinto

(57) ABSTRACT

A joint device includes a supply pipe having an ink supply port, a closing device for opening and closing the ink supply port, a deformation device for deforming the closing device and an urging device for urging the deformation device. An ink jet recording apparatus includes the above joint device, a supply pipe, a closing device, a deformation device, and an urging device. An ink supplying device includes a negative-pressure introducing device introducing negative pressure into the ink tank an ink supplying device supplying the ink to the ink tank, a gas-liquid separating device provided between the ink tank and the negative-pressure introducing device, for transmitting gases therethrough while not transmitting the ink therethrough, and an isolation device separating the negative-pressure introducing path.

18 Claims, 32 Drawing Sheets

JOINT DEVICE, INK JET RECORDING APPARATUS HAVING THE SAME, AND INK SUPPLYING DEVICE AND METHOD

This application is based on Japanese Patent Application Nos. 2000-118564 filed Apr. 19, 2000 and 2000-123295 filed Apr. 24, 2000, the content of which is incorporated hereinto by reference.

BACKGROUND OF THE INVENTION

1. Field of the Invention

The present invention relates to a joint device, an ink jet apparatus having the joint device, and an ink supplying device and method.

2. Description of the Related Art

Conventional ink jet recording apparatuses include, what is called, a serial scan type that comprises a recording head acting as recording means and an ink tank acting as an ink vessel, both being replaceably mounted on a carriage movable in a main scanning direction. This recording method comprises sequentially recording an image on a recorded medium by repeating a main scan of the carriage with the recording head and the ink tank mounted thereon and a subscan of the recorded medium.

With this recording method, an image can be recorded on a recorded medium of a large size such as A1 or A0 by increasing the movement width of the carriage. Since, however, the image is recorded on the large screen using a large amount of ink, this method requires an increase in the amount of ink accommodated in the ink tank, thereby increasing the weight of the entire carriage and proportionally an inertia force applied when the carriage is moved. To move the carriage at a high speed against the inertia force, a drive motor for the carriage must provide a high drive power, thus disadvantageously increasing the price of the entire recording apparatus. Further, the increase in the weight of the entire carriage also increases a force required to zero the acceleration of the carriage against the inertia force when the carriage reverses its direction at the turning point of a round-trip main scan; the reaction force to this force causes the entire recording apparatus to vibrate significantly. Thus, it is difficult to increase the movement speed of the carriage.

On the other hand, if the amount of ink accommodated in the ink tank is reduced to lighten the carriage, the ink tank must more frequently be replaced and the replacement must be carried out during a recording operation.

One of the solutions proposed for such an ink tank replacement problem is the technique described in Japanese Patent Application Laid-open No. 9-24698 (1997). With this conventional technique, a closed bias-bag-type ink vessel is connected to a recording head and an auxiliary ink vessel is connected to the bias-bag-type ink vessel so that the bias-bag-type ink vessel is refilled with an ink from the auxiliary ink vessel. The bias-bag-type comprises a bag for accommodating the ink and accommodates the ink therein under such negative pressure that hinders the leakage of the ink from an ink ejection port of the recording head. This negative pressure is used to refill the bias-bag-type ink vessel with the ink from the auxiliary ink vessel.

The bag of this bias-bag-type ink vessel collapses gradually to have its volume decrease with an increase in the amount of ink ejected from the recording head, that is, the amount of ink used. Once the volume of the bag decreases down to a predetermined value or smaller, a stopper to a supply port formed in the bias-bag-type ink vessel is opened and the supply port is connected to the auxiliary ink vessel. As a result, the negative pressure in the bag of the bias-bag-type ink vessel allows the ink to be supplied from the auxiliary ink vessel to the inside of the bag. When the amount of ink accommodated in the bag reaches a maxim value, the negative pressure in the bag becomes "zero" to automatically stop the ink refilling. Thus, according to this conventional technique, the negative pressure can be used to automatically stop the ink refilling without the needs for control using a pressure sensor, a volume detecting sensor, or the like.

The upper limit on the negative pressure in the bias-bag-type ink vessel is determined based on a tradeoff with the ink ejection force with which the recording head ejects the ink. This is because an excessively high negative pressure reduces the ink ejection force of the recording head, which thus cannot eject the ink. Accordingly, the negative pressure must be determined within the range of the best ink ejection conditions for the recording head. Further, the heat position of the ink in the auxiliary ink vessel must be set below that of the ink in the bias-bag-type ink vessel. With a too large difference in head position, the ink refilling is disabled even if the negative pressure in the bias-bag-type ink container is determined depending on the ink ejection conditions for the recording head.

Thus, this conventional technique includes a special device for setting the vertical height position of the auxiliary ink vessel relative to the bias-bag-type ink vessel. The inclusion of such a device, however, disadvantageously increases the size of the recording apparatus main body and costs thereof. Further, if, during ink refilling, air enters an ink channel from a portion thereof, the ink channel connecting the auxiliary ink vessel to the bias-bag-type ink vessel, the air moves to the inside of the bias-bag-type ink vessel to substantially reduce the amount of ink accommodated in the bias-bag-type ink vessel. Furthermore, if a large amount of air enters the ink channel, the inside of the bag of the bias-bag-type ink vessel is filled with air to prevent further ink refilling. Moreover, the bias-bag-type ink vessel comprises a telescopic bag member forming the bag and movable parts such as spring members for inflating the bag member, so that the size reduction of the ink vessel is limited, thus increasing the complexity, weight, and manufacturing costs of this structure.

On the other hand, in a joint portion for connecting an ink intake port formed in the ink vessel to the auxiliary ink vessel, a force required to close the joint must be increased so as to preclude the ink from leaking from the auxiliary ink tank. As a result, high power is required to open and close a joint supply port.

The present invention is adapted to solve the problems of the prior art, and an object thereof is to provide a joint device for refilling an ink tank with an ink which has a simple configuration but which can be reliably implemented using low power, thus reducing the weight and costs of a recording apparatus and making it more reliable, as well as an ink jet recording apparatus using the joint device, and an ink supplying device and method.

SUMMARY OF THE INVENTION

To attain the above object, the present invention provides a joint device for connecting and separating an ink tank capable of taking in an ink through an ink intake port to and from ink supply means connected to the ink intake port to take the ink from a refilling tank in the ink tank, the joint device being characterized by comprising a supply pipe having an ink supply port disposed therein, closing means composed of an elastic member, for opening and closing the ink supply port, deformation means for deforming the closing means, and urging means for urging the deformation means. Accordingly, the joint device for refilling the ink tank with an ink can be produced to have the simple configuration and can be reliably implemented by using low power despite the simple configuration, thereby reducing the weight of a recording apparatus and making the recording apparatus more reliable.

The joint device of the present invention is also characterized in that the deformation means operates during a connection operation in such a manner as to relieve the deformation of the closing means and then slide over the supply pipe. The deformation means thus scrapes and removes attachments such as dirt and ink which adhere to an abutment surface, to prevent leakage from the joint due to the attachments.

The joint device of the present invention is further characterized in that the closing means has a sucker-shaped portion additionally formed therein and which is sufficiently deformed to allow the deformation means to operate, thereby ensuring that the ink supply port is closed to prevent the leakage and drying of the ink.

The joint device of the present invention is further characterized in that recesses and projections are formed near the ink intake port so that the sucker-shaped portion is deformed in such a manner as to rub against the recesses and projections. Consequently, attachments such as dirt and ink which adhere to the abutment surface can be scraped for cleaning, thereby precluding leakage from the joint due to the attachments to reliably prevent the leakage of the ink.

The present invention provides an ink jet recording apparatus having an a joint device for connecting and separating an ink tank capable of taking in an ink through an ink intake port to and from ink supply means connected to the ink intake port to take the ink from a refilling tank in the ink tank, the ink jet recording apparatus being characterized by comprising a supply pipe having an ink supply port disposed therein, closing means composed of an elastic member, for opening and closing the ink supply port, deformation means for deforming the closing means, and urging means for urging the deformation means. Accordingly, the joint device for refilling the ink tank with an ink can be produced to have the simple configuration and can be reliably implemented using low power despite the simple configuration, thereby reducing the weight of the recording apparatus and making the recording apparatus more reliable.

The ink jet recording apparatus of the present invention is also characterized in that the deformation means operates during a connection operation in such a manner as to relieve the deformation of the closing means and then slide over the supply pipe. The deformation means thus scrapes and removes attachments such as dirt and ink which adhere to an abutment surface, to prevent leakage from the joint due to the attachments.

The ink jet recording apparatus of the present invention is further characterized in that the closing means has a sucker-shaped portion additionally formed therein and which is sufficiently deformed to allow the deformation means to operate, thereby ensuring that the ink supply port is closed to prevent the leakage and drying of the ink.

The ink jet recording apparatus of the present invention is further characterized in that recesses and projections are formed near the ink intake port so that the sucker-shaped portion is deformed in such a manner as to rub against the recesses and projections. Consequently, attachments such as dirt and ink which adhere to the abutment surface can be scraped for cleaning, thereby precluding leakage from the joint due to the attachments to reliably prevent the leakage of the ink.

The present invention provides an ink jet recording apparatus comprising an ink tank capable of taking in an ink through an ink intake port and ink supply means capable of taking an ink from a refilling tank in the ink tank by means of negative pressure introduced into the ink tank through a suction port therein, the ink jet recording apparatus being characterized in that the suction port has gas-liquid separating means for transmitting gases therethrough while not transmitting the ink therethrough. Thus, air as a gas is separated from the ink, so that only the air can be discharged from the ink tank, while the ink can be supplied.

The ink jet recording apparatus of the present invention is characterized in that the gas-liquid separating means is selected from polytetrafluoroethylene and similar porous resin materials which transmit gases therethrough while not transmitting liquids therethrough. Accordingly, the gas-liquid separating means can be properly produced using an inexpensive material.

The present invention provides an ink jet recording apparatus that can record an image on a recorded medium using an ink jet recording head capable of ejecting an ink supplied from an ink tank, the ink jet recording apparatus being characterized by comprising negative-pressure introducing means capable of introducing negative pressure into the ink tank, ink supplying means for capable of supplying the ink to an interior of the ink tank using the negative pressure in the ink tank, gas-liquid separating means provided in a negative-pressure introducing path located between the ink tank and the negative-pressure introducing means, for transmitting gases therethrough while not transmitting the ink therethrough, and isolation means capable of separating a middle site of the negative-pressure introducing path located between the gas-liquid separating means and the negative-pressure introducing means. Accordingly, the ink tank can be reliably refilled with the ink using the simple configuration, thereby reducing the weight and costs of the recording apparatus and making the recording apparatus more reliable.

The ink jet recording apparatus of the present invention is also characterized in that the gas-liquid separating means is supported by the ink tank and is movable between at least two positions including a first position used while the ink is not supplied and a second position used during an ink supply. Consequently, the gas-liquid separating means is prevented from contacting with the ink at the first position and thus from having its performance degraded.

The ink jet recording apparatus of the present invention is further characterized in that the isolation means has a connection portion to which the middle site of the negative-pressure introducing path is separably connected, thereby ensuring that the negative-pressure introducing path is connected to and separated from the ink tank for proper connection and isolation.

The ink jet recording apparatus of the present invention is further characterized by having movement means for moving the ink tank so that when the ink tank moves to a predetermined ink supplying position and a predetermined home position, the isolation means connects the middle site of the negative-pressure introducing path to the ink tank and so that when the ink tank moves away from the ink supplying position and the home position, the isolation means isolates the middle site of the negative-pressure introducing path from the ink tank. Accordingly, the middle site of the negative-pressure introducing path can be reliably separated from the ink tank.

The ink jet recording apparatus of the present invention is characterized by having the movement means for moving the ink tank so that when the ink tank moves to a predetermined ink supplying position, the isolation means connects the middle site of the negative-pressure introducing path to the ink tank and so that when the ink tank moves away from the ink supplying position, the isolation means isolates the middle site of the negative-pressure introducing path from the ink tank. Consequently, the ink tank can be properly moved and reliably isolated.

The ink jet recording apparatus of the present invention is characterized in that when the ink tank moves away from the ink tank supply position, the gas-liquid separating means is driven to the first position and in that when the ink tank moves to the ink tank supply position, the gas-liquid separating means is driven to the second position. Accordingly, the gas-liquid separating means can be properly connected and separated in connection with the movement of the ink tank.

The ink jet recording apparatus of the present invention is further characterized in that while the gas-liquid separating means is being driven between the first and second positions, a part of the negative-pressure introducing path is in communication with the atmosphere. Thus, during the movement, the negative-pressure introducing path is prevented from undergoing the negative pressure.

The ink jet recording apparatus of the present invention is further characterized in that the movement means moves the ink jet recording head together with the ink tank. Consequently, the movement means may be of a minimum size; the use of excess-sized movement means is avoided.

The ink jet recording apparatus of the present invention is further characterized in that the gas-liquid separating means is a gas-transmitting film composed of polytetrafluoroethylene or a similar porous resin material. Accordingly, the gas-liquid separating means can be inexpensively produced to have a simple configuration.

The ink jet recording apparatus of the present invention is also characterized in that the gas-liquid separating means is a gas-transmitting film composed of porcelain, unglazed pottery, ceramic, or a similar porous material. Thus, the gas-liquid separating means can be inexpensively produced to have a simple configuration.

The ink jet recording apparatus of the present invention is further characterized in that the gas-liquid separating means undergoes an oil-repelling process. As a result, the simple means can be used to improve the oil-repelling effect of the gas-liquid separating means.

The ink jet recording apparatus of the present invention is further characterized in that the ink jet recording head has an elcetrothermal converter for generating thermal energy as energy required to eject the ink. Consequently, the ink can be appropriately ejected for proper recording.

The present invention provides an ink supplying device characterized by comprising negative-pressure introducing means capable of introducing negative pressure into the ink tank, ink supplying means for capable of supplying the ink to an interior of the ink tank using the negative pressure in the ink tank, gas-liquid separating means provided in a negative-pressure introducing path located between the ink tank and the negative-pressure introducing means, for transmitting gases therethrough while not transmitting the ink therethrough, and isolation means capable of separating a middle site of the negative-pressure introducing path located between the gas-liquid separating means and the negative-pressure introducing means. Accordingly, the ink tank can be reliably refilled with the ink using the simple configuration, thereby reducing the weight and costs of the recording apparatus and making the recording apparatus more reliable.

The ink supplying device of the present invention is also characterized in that the gas-liquid separating means is supported by the ink tank and is movable between at least two positions including a first position used while the ink is not supplied and a second position used during an ink supply. Thus, the gas-liquid separating means can be properly connected and separated in connection with the movement of the ink tank.

The ink supplying device of the present invention is further characterized in that the isolation means has a connection portion to which the middle site of the negative-pressure introducing path is separably connected, thereby ensuring that the negative-pressure introducing path is connected to and separated from the ink tank for proper connection and isolation.

The ink supplying device of the present invention is further characterized by having movement means for moving the ink tank so that when the ink tank moves to a predetermined ink supplying position and a predetermined home position, the isolation means connects the middle site of the negative-pressure introducing path to the ink tank and so that when the ink tank moves away from the ink supplying position and the home position, the isolation means isolates the middle site of the negative-pressure introducing path from the ink tank. Consequently, the ink tank can be reliably refilled with the ink using the simple configuration, thereby reducing the weight and costs of the recording apparatus and making the recording apparatus more reliable.

The ink supplying device of the present invention is characterized by having movement means for moving the ink tank so that when the ink tank moves to a predetermined ink supplying position, the isolation means connects the middle site of the negative-pressure introducing path to the ink tank and so that when the ink tank moves away from the ink supplying position, the isolation means isolates the middle site of the negative-pressure introducing path from the ink tank. Consequently, the ink tank can be properly moved and reliably isolated.

The ink supplying device of the present invention is characterized in that when the ink tank moves away from the ink tank supply position, the gas-liquid separating means is driven to the first position and in that when the ink tank moves to the ink tank supply position, the gas-liquid separating means is driven to the second position. Accordingly, the gas-liquid separating means can be properly connected and separated in connection with the movement of the ink tank.

The ink supplying device of the present invention is further characterized in that while the gas-liquid separating means is being driven between the first and second positions, a part of the negative-pressure introducing path is in communication with the atmosphere. Thus, during the movement, the negative-pressure introducing path is prevented from undergoing the negative pressure.

The ink supplying device of the present invention is further characterized in that the gas-liquid separating means is a gas-transmitting film composed of polytetrafluoroethylene or a similar porous resin material. Accordingly, the gas-liquid separating means can be inexpensively produced to have a simple configuration.

The ink supplying device of the present invention is also characterized in that the gas-liquid separating means is a gas-transmitting film composed of porcelain, unglazed pottery, ceramic, or a similar porous material. Consequently, the gas-liquid separating means can be inexpensively produced to have a simple configuration.

The ink supplying device of the present invention is further characterized in that the gas-liquid separating means undergoes an oil-repelling process. Thus, the simple means can be used to improve the oil-repelling effect of the gas-liquid separating means.

The present invention provides an ink supplying method characterized in that the method includes negative-pressure introducing means, gas-liquid separating means provided in a negative-pressure introducing path capable of introducing a negative pressure into an ink tank, the gas-liquid separating means transmitting gases therethrough while not transmitting inks therethrough, and isolation means provided in a middle site of the negative-pressure introducing path located between the gas-liquid separating means and the negative-pressure introducing means, the isolation means being capable of isolating the middle site, in that when the ink tank moves to a predetermined ink supplying position and a predetermined home position, the middle site of the negative-pressure introducing path is connected, in that when the ink tank moves to the ink supplying position, the gas-liquid separating means is located at the second position and the negative pressure is introduced into the ink tank through the negative-pressure introducing path, so that the ink is supplied to an interior of the ink tank using the negative pressure in the ink tank, in that when or after the ink comes into contact with the gas-liquid separating means, the gas-liquid separating means stops introducing the negative pressure into the ink tank, in that when the ink tank leaves the ink supplying position and the home position, the middle site of the negative-pressure introducing path is isolated, and in that when the ink tank leaves the ink supplying position, the gas-liquid separating means is located at the first position. Accordingly, the ink tank can be reliably refilled with the ink using the simple configuration, thereby reducing the weight and costs of the recording apparatus and making the recording apparatus more reliable.

The present invention provides an ink supplying method characterized in that the method includes gas-liquid separating means provided in a negative-pressure introducing path capable of introducing a negative pressure into an ink tank, the gas-liquid separating means transmitting gases therethrough while not transmitting inks therethrough, and isolation means provided in a middle site of the negative-pressure introducing path located between the gas-liquid separating means and the negative-pressure introducing means, the isolation means being capable of isolating the middle site, in that when the ink tank moves to a predetermined ink supplying position, the middle site of the negative-pressure introducing path is connected, the gas-liquid separating means is located at the second position, and the negative pressure is introduced into the ink tank through the negative-pressure introducing path, so that the ink is supplied to an interior of the ink tank using the negative pressure in the ink tank, in that when or after the ink comes into contact with the gas-liquid separating means, the gas-liquid separating means stops introducing the negative pressure into the ink tank, in that when the ink tank leaves the ink supplying position, the middle site of the negative-pressure introducing path is isolated and the gas-liquid separating means is located at the first position. Accordingly, the ink tank can be reliably refilled with the ink using the simple configuration, thereby reducing the weight and costs of the recording apparatus and making the recording apparatus more reliable.

The above and other objects, features and advantages of the present invention will become more apparent from the following description of embodiments thereof taken in conjunction with the accompanying drawings.

DESCRIPTION OF THE PREFERRED EMBODIMENTS

Embodiments of the present invention will be described below in detail with reference to the drawings.

First Embodiment

Figure 1:
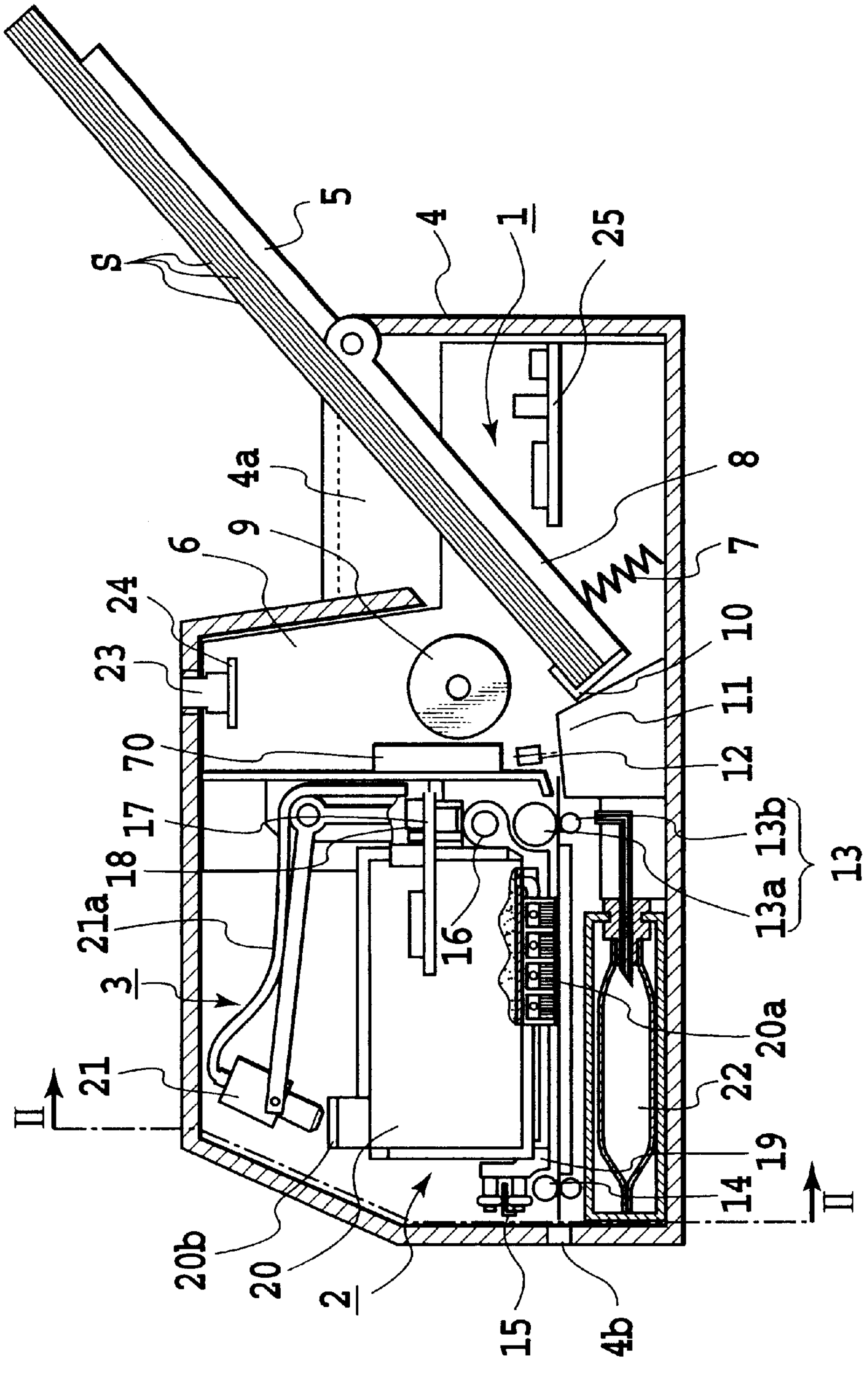
FIG. 1 is a sectional view of a recording apparatus according an embodiment of the present invention.
Figure 2:
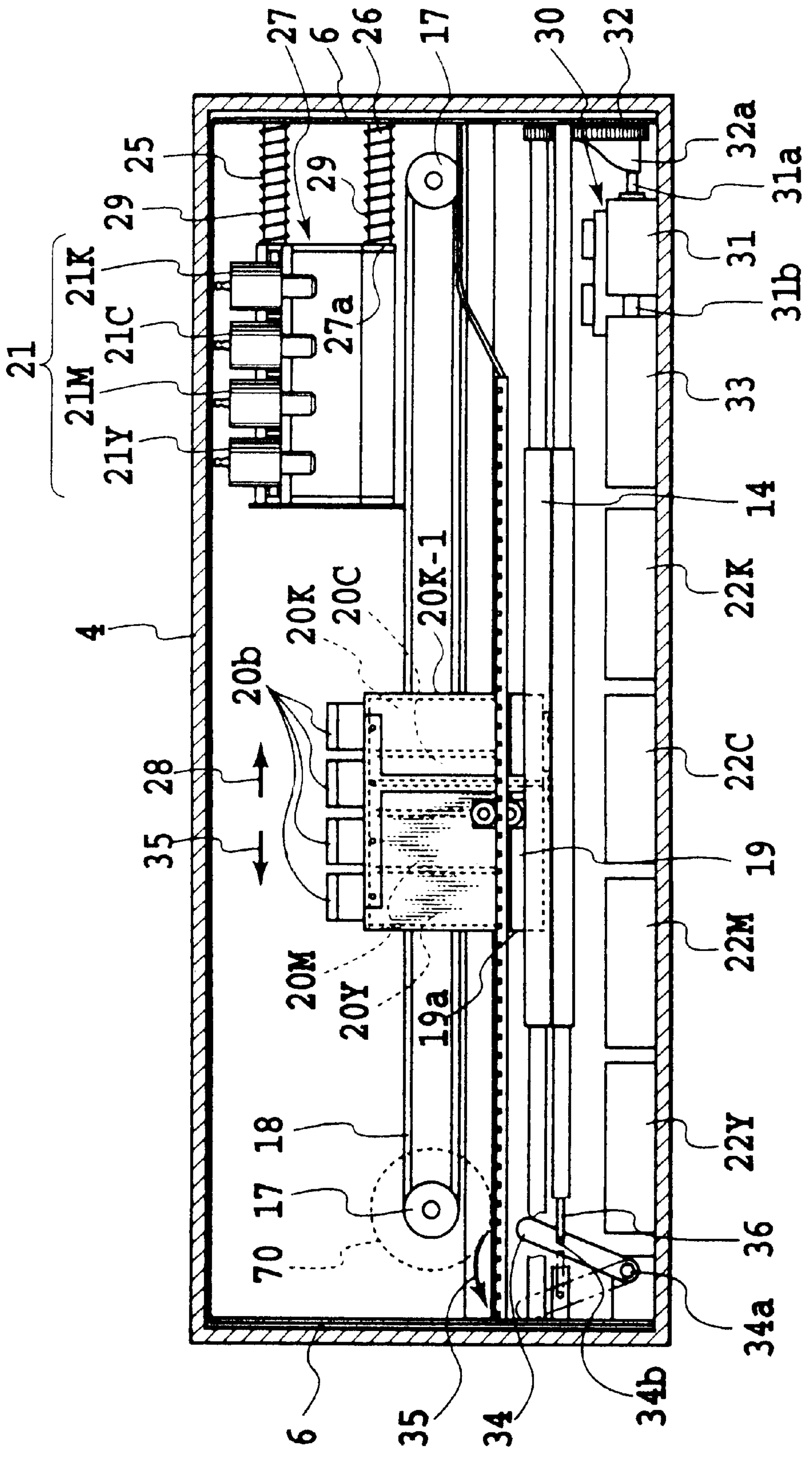
FIG. 2 is a sectional view taken along line II—II in FIG. 1.

FIGS. 1 and 2 are views useful in explaining the entire ink jet recording apparatus in which a joint device according to the present invention is used. In this application, the ink jet recording apparatus operates based on a serial scan method with which a recording head moves in a main scan direction.

In FIG. 1, the ink jet recording apparatus of the present invention principally comprises a feeding device section 1 for feeding recorded media S, a recording device section 2 performing a recording operation, an ink refilling device section 3 for executing ink refilling, a cap device section 30 (see FIG. 6) or the like, as shown in the drawing. The configurations of the feeding device section 1, the recording device section 2, and the ink refilling device 3 will be separately explained below.

Configuration of Feeding Device Section 1

As shown in the drawings, the feeding device section 1 has a cover 4 installed outside the apparatus main body and an installation table 5 allowing a plurality of recorded media S to be loaded thereon. The recorded media S are inserted through an insertion port 4*a* formed in the cover 4 and are discharged through a discharge port 4*b*. A mounting table 8, a feeding roller 9, and a guide member 11 are installed inside a side plate 6 provided inside the cover 4. The mounting table 8 constitutes means for mounting the recorded media S thereon and is urged toward the feeding roller 9 located above, by means of a spring 7. The feeding roller 9 constitutes feeding means and abuts against the highest of the plurality of recorded media S on the mounting table 8. Further, the guide member 11 guides one of the recorded media S which is separated by separation means 10, toward the recording device section 2.

Configuration of Recording Device Section 2

The recording device section 2 comprises a photosensor 12 for detecting the recorded media S passing a downstream side of the guide member 11, a set 13 of transfer rollers 13*a* and 13*b* for transferring the fed recorded media S at a fixed speed, a set 14 of discharge rollers for discharging the recorded media S after image recording, and a carriage 19 movably guided by guide means 15 and 16 in a main scan direction (the width direction of the recorded media S) shown by the arrows 28 and 35 in FIG. 2. The carriage 19 is moved in the main scan direction via a belt 18 extended between pulleys 17 and 17, by means of a driving force transmitted by a carriage motor 70. Reference numeral 20 denotes a storage ink tank replaceably mounted on the carriage 19. Reference numeral 20*a* denotes a recording head acting as image forming means for ejecting an ink from the storage ink tank 20 to the recorded media S based on image information. In this example, the storage ink tank 20 and the recording head 20*a* constitute an integrally coupled ink jet cartridge. The ink tank 20 and the recording head 20*a* may be individually constructed and then removably coupled together or may be individually installed on the carriage 19.

The storage ink tank 20 in this example is separated into an ink tank 20Y for a yellow ink, an ink tank 20M for a magenta ink, an ink tank 20C for a cyan ink, and an ink tank 20K for a black ink, as shown in FIG. 2. The ink tanks 20Y, 20M, 20C, and 20K each have an ink intake port 20*b* for taking in the ink. The ink intake port 20*b* is formed of a flexible valve member such as rubber.

Figure 6:
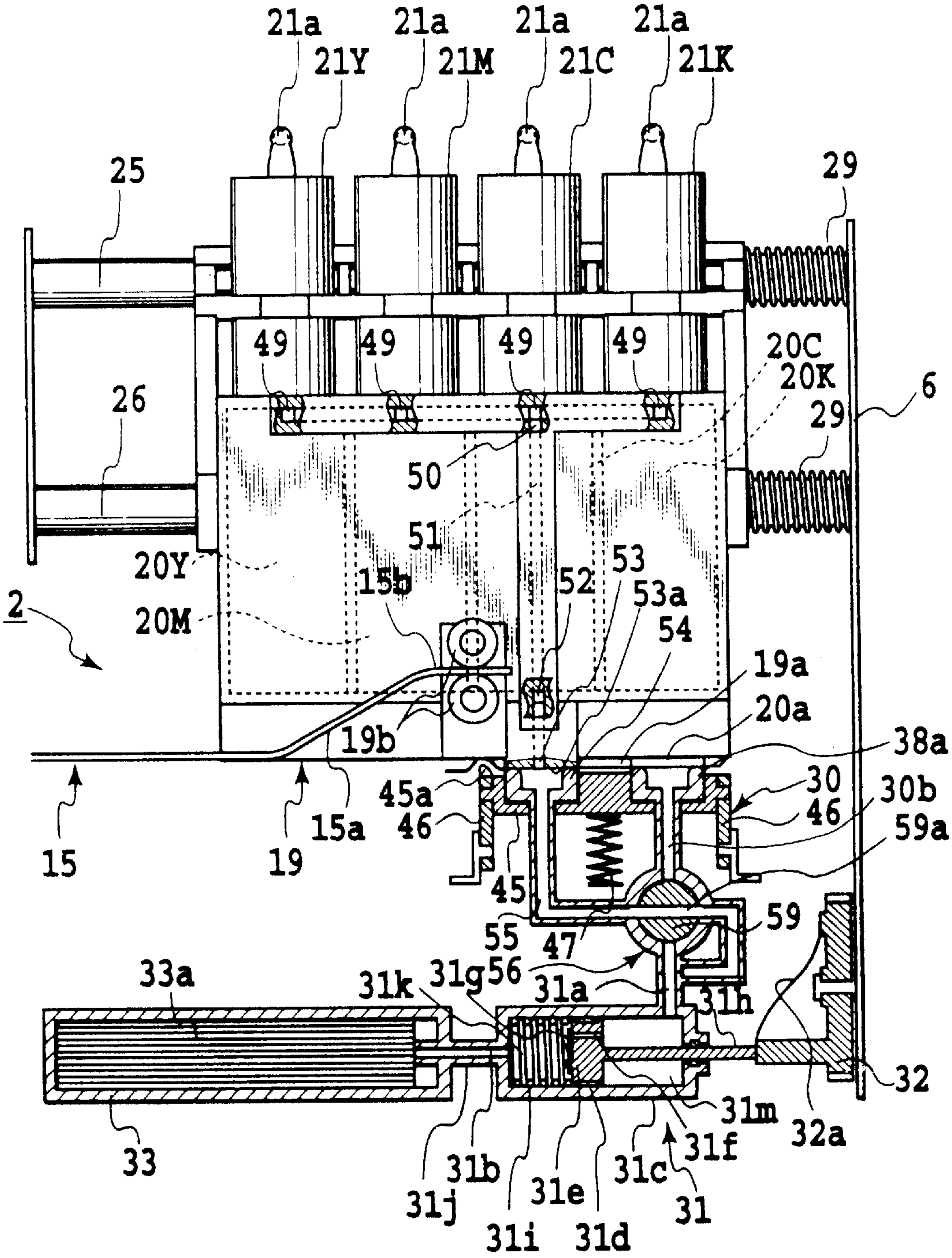
FIG. 6 is a sectional view of an air sucking system showing how it operates when an ink is supplied to the storage ink tank in FIG. 3.
Figure 7:
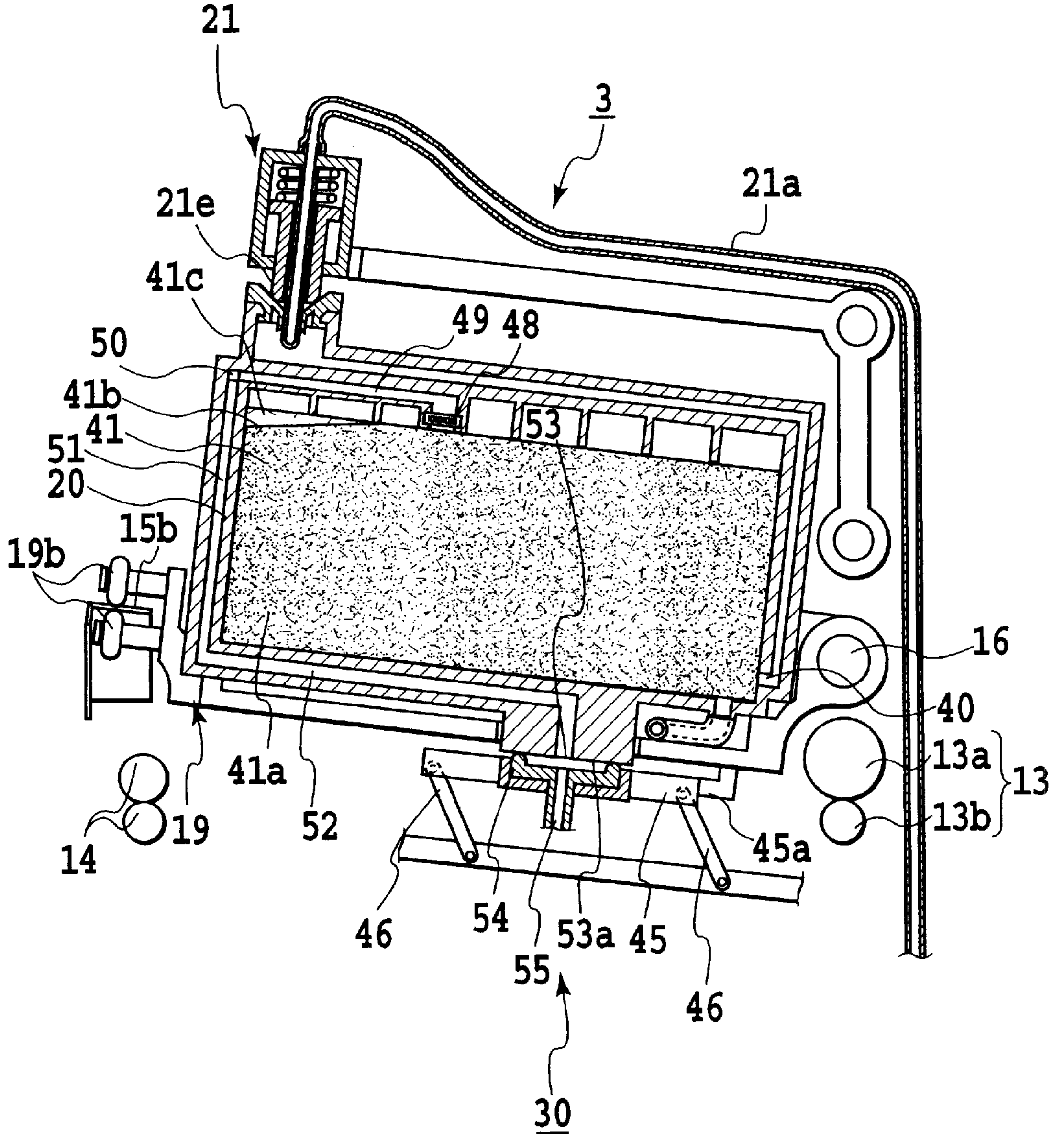
FIG. 7 is a sectional view of the storage ink tank in FIG. 3 showing how it operates during an ink supply.

Reference numeral 48 denotes a gas transmitting member provided at the intake port of each of the ink tanks 20Y, 20M, 20C, and 20K and having a function as gas-liquid separating means for transmitting gases therethrough while not transmitting the inks therethrough. The gas transmitting member 48 is a thin sheet formed of polytetrafluoroethylene or a similar porous resin material. As shown in FIGS. 6 and 7, an air discharging path in each of the ink tanks 20Y, 20M, 20C, and 20K leads through the gas transmitting member 48, a vent passage 49, and common vent passages 50, 51, and 52 to a general suction port 53.The air in the ink tanks 20Y, 20M, 20C, and 20K is sucked from a cap member 54 through a vent pipe 57 by a suction pump 31, as described later; the cap member 54 is in tight contact with a surface 53*a* in which the general suction port 53 is opened.

The recording head 20*a* is composed of a plurality of head portions provided independently for each color, and the head portion comprises liquid chamber portions 43 which are each in communication with a channel 41 to a corresponding one of the ink tanks 20Y, 20M, 20C, and 20K, and a plurality of ink ejecting nozzles 44. The nozzle 44 forms a communication passage in communication with an ink ejecting port; ejection energy generating means is provided for generating energy for ejecting the ink through the ink ejection port.

Configuration of Ink Refilling Device Section 3

The ink refilling device section 3 has ink supplying means 21 in communication with a refilling ink tank 22 via a tube

21*a* forming an ink forming passage. The ink supplying means 21 refills the storage ink tank 20 with the ink from the refilling ink tank 22 when connected tightly to the ink intake port 20*b* in the storage ink tank 20.

The refilling ink tank 22 is separated into an ink tank 22Y for a yellow ink, an ink tank 22M for a magenta ink, an ink tank 22C for a cyan ink, and an ink tank 22K for a black ink, as shown in FIG. 2. The ink tanks 22Y, 22M, 22C, and 22K are connected to ink supplying means 21Y, 21M, 21C, and 20K corresponding thereto in terms of the colors, via the corresponding tubes 21*a*.

The ink supplying means 21 are installed on a movement table 27 as shown in FIG. 2. The movement table 27 is guided by guide members 25 and 26 so as to be movable in the lateral direction of FIG. 2. When the carriage 19 moves in the direction of the arrow 28 and a side 20K-1 of the storage ink tank 20K abuts against an arm portion 27*a* of the movement table 27, the movement table 27 moves in the direction of the arrow 28 integrally with the carriage 19 and against the force of a spring 29.

Figure 3:
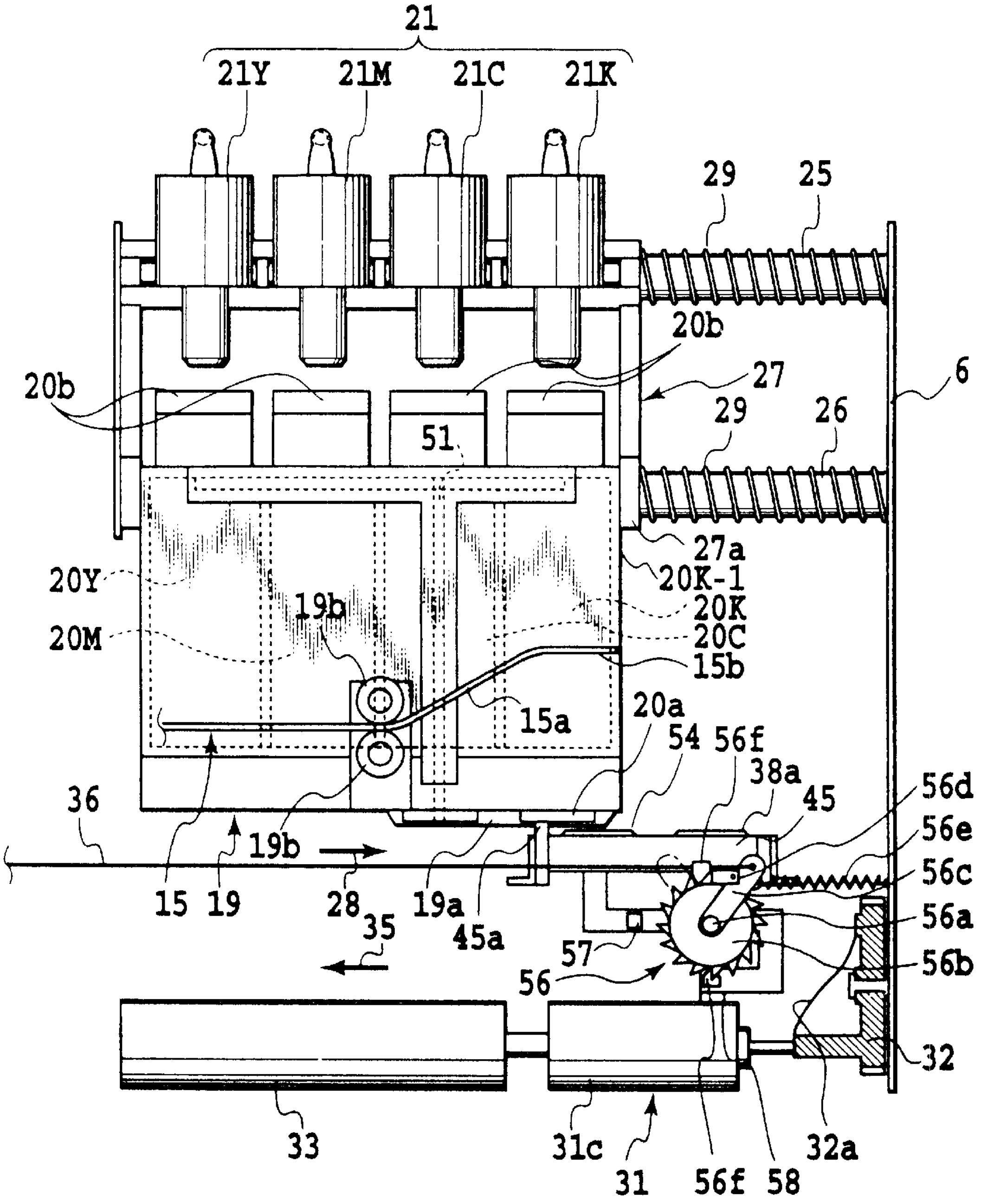
FIG. 3 is an enlarged front view of a storage ink tank section in FIG. 2.
Figure 5:
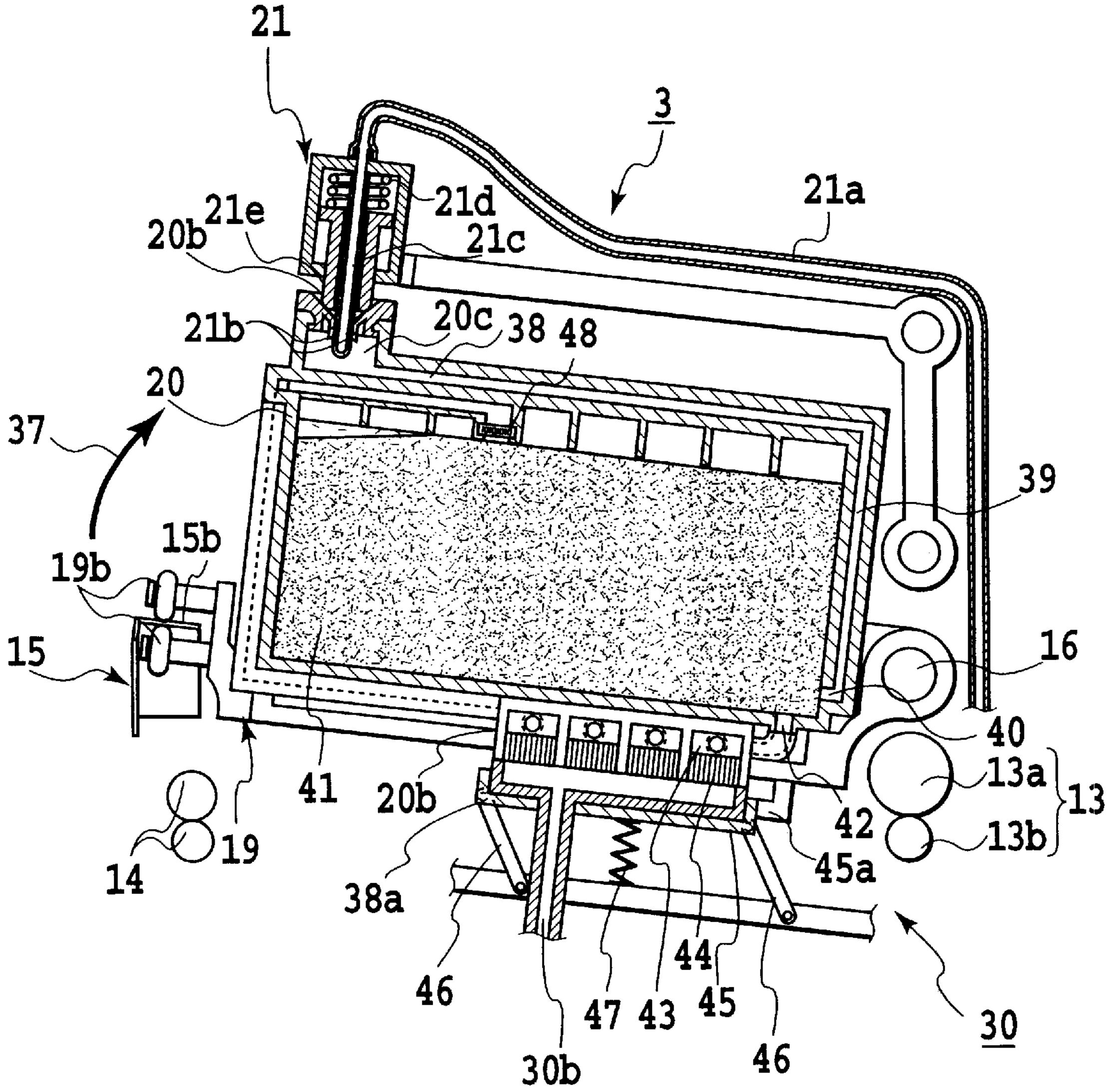
FIG. 5 is a sectional view showing that the storage ink tank is inclined in FIG. 3.

Further, the carriage 19 moves in the direction of the arrow 28 to rotationally move in the direction of an arrow 37 using the guide member 16 as a rotating shaft, as shown in FIG. 5. The rotational movement of the carriage 19 connects the ink supplying means 21 to the ink intake port 20*b* in the storage ink tank 20. That is, the carriage 19 has a pair of guide rollers 19*b* attached thereto, for supporting the carriage 19 against the guide member 15, as shown in FIG. 3. When the movement of the carriage 19 in the direction of the arrow 28 causes the side 20K-1 of the storage ink tank 20K against the arm portion 27*a* of the movement table 27, which then starts moving in the direction of the arrow 28 together with the carriage 19, the pair of guide rollers 19*b* move from an inclined portion 15*a* of the guide member 15 to its horizontal portion 15*b*. The carriage 19 thus rotationally moves in the direction of the arrow 37 using the guide member 16 as a rotating shaft, thus connecting the ink supplying means 21 to the ink intake port 20*b* in the storage ink tank 20, as shown in FIG. 5.

Figure 4:
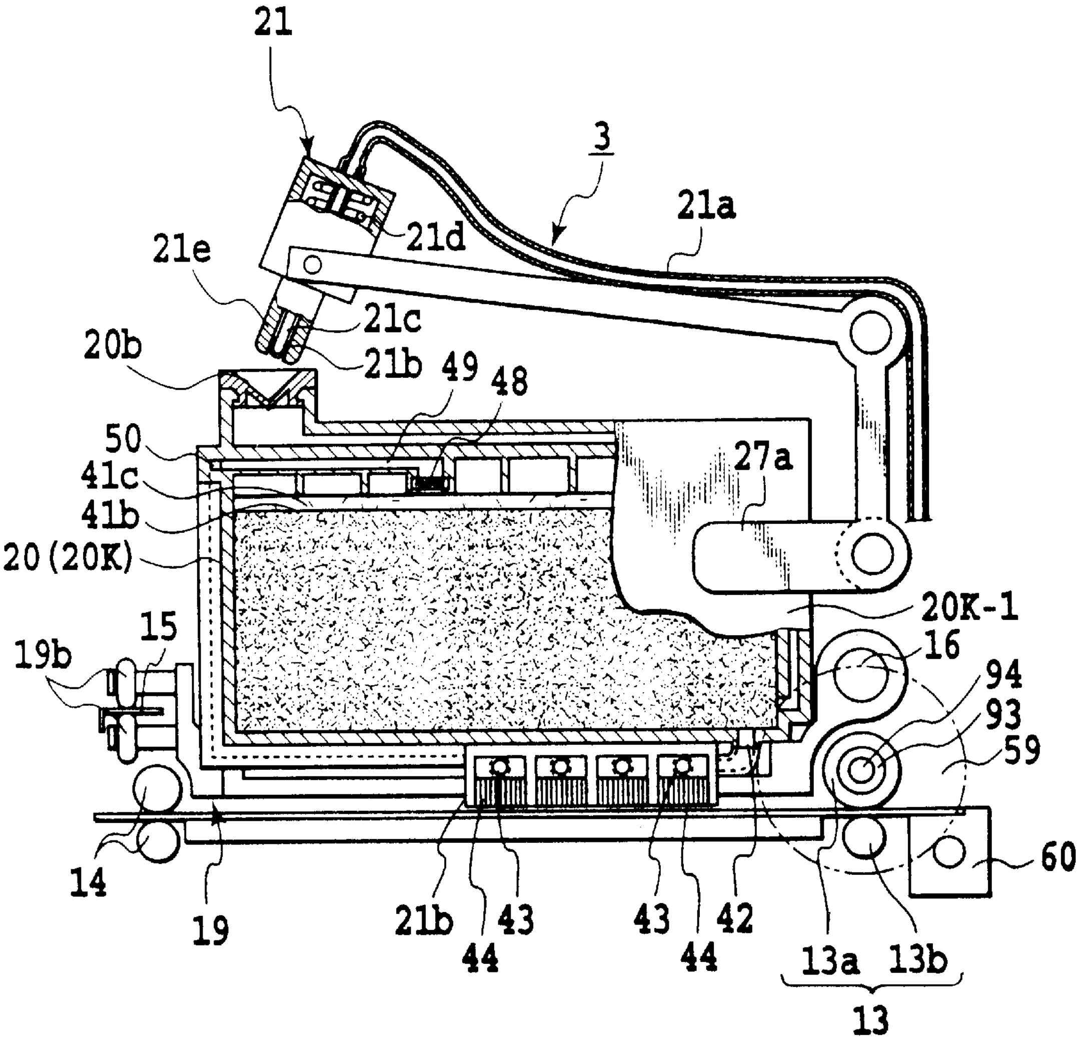
FIG. 4 is a sectional view of the storage ink tank in FIG. 3.

As shown in FIGS. 4 and 5, the ink supplying means 21 includes a hollow needle 21*c* with a closed tip having a pore-like ink supplying port 21*b* penetrating the tip in the lateral direction of FIG. 5. The hollow needle 21*c* has a piston-like stopper member 21*e* provided around its outer periphery and which is movable in the vertical direction of FIG. 5 using the hollow needle 21*c* as a shaft. The stopper member 21*e* is formed of a flexible member such as rubber and is urged downward by means of a spring 21*d*.

As shown in FIG. 4, before the ink supplying means 21 is connected to the ink intake port 20*b* in the storage ink tank 20, the pore 21*b* in the hollow needle 21*c* is covered and blocked by the stopper member 21*e*. Thus, at this time, the ink is prevented from leaking from the hollow needle 21*c*. At the same time, the ink intake port 20*b* in the ink tank 20, which is formed of a flexible valve member such as rubber, is closed by means of the recovery force of the valve member.

On the other hand, as shown in FIG. 5, when the ink supplying means 21 is connected to the ink intake port 20*b* in the storage ink tank 20, a top surface of the ink intake port 20*b* and a bottom surface of the stopper member 21*e* are in tight contact with each other. Furthermore, the stopper member 21*e* recedes upward against the force of the spring 21*d*, and the pore 21*b* in the hollow needle 21*c* is opened in an interior 20*c* of the ink intake port 20*b*. This causes the ink flowing out from the pore 21*b* to flow through channels 38, 39, and 40 until it is absorbed by a sponge-like ink absorber 41 in the storage ink tank 20.

Configuration of Cap Device Section 30

The cap device section 30 is in tight contact with the recording head 20*a* to suck therefrom air collected in the liquid chamber portion 43 or the nozzle 44 or a thickened ink, that is, substances causing inappropriate ejection. In FIG. 5, reference numeral 38*a* denotes a cap member covering a surface (ink ejection port forming surface) of the recording head 20*a* in which the ink ejecting port is formed. Reference numeral 54 denotes a cap member in tight contact with a surface 53*a* in which the general suction port 53 is opened. The cap members 38*a* and 54 are held by a frame 45. The frame 45 is vertically movably supported by four link arm members 46. Reference numeral 47 denotes a spring for urging the frame 45 upward. The cap members 38*a* and 54 have conduits 30*b* and 55 connected thereto, respectively. The conduits 30*b* and 55 are connected to a switching mechanism 56 of a pump suction passage.

Switching Mechanism 56 of Pump Suction Passage

The frame 45 has a projecting portion 45*a* provided at one end thereof and located on a movement locus of an embankment portion 19*a* provided at a specified location of the carriage 19. While the carriage 19 is moving and when the embankment portion 19*a* abuts against the projecting portion 45*a,* the frame 45 is pushed down against the force of the spring 47 and the ink ejection forming surface of the recording head 20*a* and the surface 53*a* with the general suction port 53 formed therein pass above the cap members 38*a* and 45 without contacting with them, as shown in FIG. 3. On the other hand, when the embankment portion 19*a* leaves the projecting portion 45*a,* the frame 45 is raised by the spring 47 to bring the cap member 38*a* in tight contact with the ink ejection port forming surface, while bringing the cap member 54 into contact with the surface 53*a* with the general suction port 53 formed therein, as shown in FIG. 6.

The switching mechanism 56 with the conduits 30*b* and 55 connected thereto includes a rotary valve 59 composed of rubber or the like as shown in FIG. 6. The rotary valve 59 selectively connects the conduits 30*b* and 55 to the pump suction port 31*a* of the suction port 31 via its conduction passage 59*a* depending on its rotational-movement position; the rotational-movement positions are spaced from each through 90°. The rotary valve 59 is fixed to a rotating shaft 56*a* in FIG. 3. The rotary shaft 56*a* has a saw-tooth gear 56*b* fixed thereto and a proximal end of an arm member 56*c* rotatably journaled thereto. The arm member 56*c* has a ratchet gear 56*d* rotatably journaled thereto and meshing with the saw-tooth gear 56*b* in only one direction. Reference numeral 56*e* denotes a spring that urges the arm member 56*c* clockwise in FIG. 3 and reference numeral 56*f* denotes two position indicating members provided on the saw-tooth gear 56*b* and spaced from each other with an angular difference of 180°. Reference numerals 57 and 58 denote position detectors for detecting the position indicating members 56*f*; the detectors are spaced from each other with an angular difference of 90°. The position detectors 57 and 58 comprise microswitches, photosensors, or the like.

A tip of the arm member 56*c* is connected to an aperture portion 34*b* of a switching lever 34 (FIG. 2) via a connection shaft 36. The proximal end of the switching lever 34 is rotatably journaled around a shaft 34*a*. When the carriage 19 moves in the direction of the arrow 35 to come into abutment with the tip of the switching lever 34 and further moves in the direction of the arrow 35, the switching lever 34 moves rotationally in the direction of the arrow 35 as shown by the alternate long and two short dot line in FIG. 2. In response to the rotational movement of the switching lever 34 in the direction of the arrow 35, the arm member 56*c* is rotated counterclockwise in FIG. 3 through 90° against the force of the spring 56*e*. At this time, the ratchet gear 56*d* meshes with the saw-tooth gear 56*b*, so that the saw-tooth gear 56*b* is rotated counterclockwise through 90° together with the rotating shaft 56*a* and the rotary valve 59. Subsequently, when the carriage 19 leaves the tip of the switching lever 34 in the direction of the arrow 28, the force of the spring 56*e* rotationally moves clockwise the switching lever 34 and the arm member 46*c* back to their original positions. During this time, since the ratchet gear 56*d* does not mesh with the saw-tooth gear 56*b*, the saw-tooth gear 56*b* is not rotated.

Figure 8:
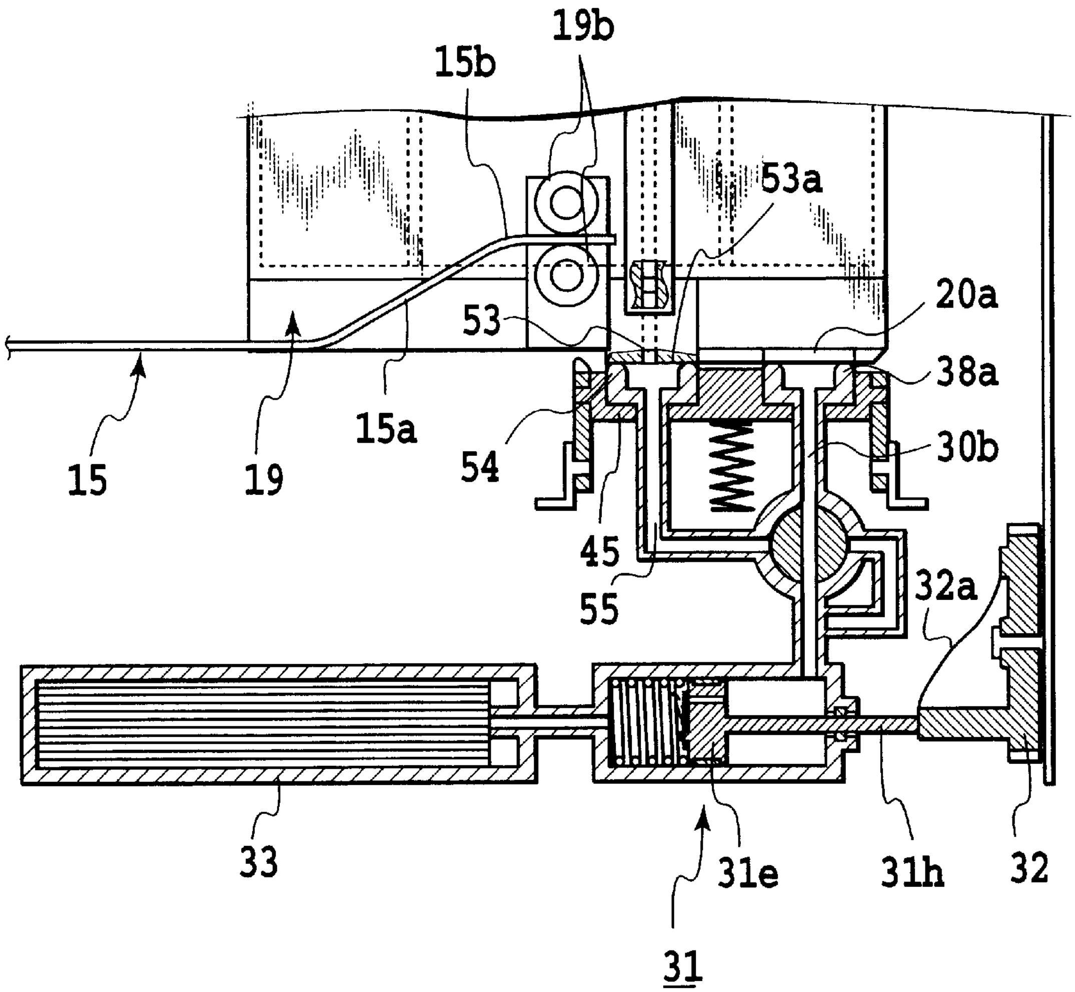
FIG. 8 is a partly cutaway sectional view of the air suction system showing how it operates when suction of a recording head is recovered in FIG. 3.

In this manner, each time the carriage 19 rotationally moves the switching lever 34 in the direction of the arrow 35, the rotary valve 59 is rotationally moved counterclockwise through 90° to switch the pump suction passage. The switching position of the pump suction passage is detected by the position detectors 57 and 58. FIG. 6 shows a switching state where the position detector 57 detects the position indicating member 56*f;* at this time, the general suction port 53 is brought into communication with the pump 31 through the cap member 54, the conduit 55, the conduction passage 59*a,* and the pump suction port 31*a*. FIG. 8 shows a switching state where the position detector 58 detects the position indicating member 56*f;* at this time, the ink ejecting port in the recording head 20*a* is brought into communication with the pump 31 through the cap member 38*a,* the conduit 30*b*, the conduction passage 59*a,* and the pump suction port 31*a*. Control means 25 (see FIG. 1), described later, detects the switching state of the pump suction passage from a detection signal from the position detector 57 or 58. If the switching state of the pump suction passage does not match an operation to perform, the control means moves the carriage 19 in the direction of the arrow 35 to rotationally move the switching lever 34 in the direction of the arrow 35. The pump suction passage is thus switched so as to meet the operational purpose.

In FIG. 1, reference numeral 24 denotes an electric circuit board arranged inside the cover 4 and having a plurality of switch buttons 23 that project upward through an aperture in the cover 4. Reference numeral 25 denotes control means comprising a computer, a memory, or the like mounted on the controlling electric circuit board 24 arranged inside the cover 4. The control means 25 controls the present recording apparatus while communicating with a host computer.

Suction Pump 31

As shown in FIG. 6, the suction pump 31 includes a piston member 31*e* installed in a cylinder member 31*c* via a seal member 31*d* for reciprocative motion, the cylinder member 31*c* having the suction port 31*a* and a discharge port 31*b*. The pore 31*f* formed in the piston member 31*e* includes a lead valve 31*g* for limiting the flow of a liquid to one direction, that is, the left direction of FIG. 6. Reference numeral 31*h* denotes a piston shaft for driving the piston member 31*e,* and reference numeral 31*i* denotes a spring member for urging the piston member 31*e* rightward in FIG. 6. An ink or air sucked by the suction pump 31 is discharged from the discharge port 31*b* through a discharge pipe 31*j* toward a sponge-like ink absorber 33*a* in a waste container 33.

The piston shaft 31*h* reciprocates in the lateral direction of FIG. 6 in a fashion following rotational movement of a cam portion 32*a* of a cam gear 32 described later. The piston member 31*e* reciprocates in the lateral direction together with the piston shaft 31*h* to suck the ink or air from the suction port 31*a* and discharge it from the discharge port 31*b*.

A shaft 94 of a transfer roller 13*a* has a gear 56 attached thereto via a one-way clutch 93 as shown in FIG. 4; the gear 56 is rotated by a drive motor 60. When the drive motor 60 rotates counterclockwise, the shaft 94 of the transfer roller 13*a* is rotated. When the drive motor 60 rotates clockwise, the cam gear 32 is rotated. The piston shaft 31*h* is abutted against the cam portion 32*a* of the cam gear 32 by means of the force of the spring 31*i* and is moved in the lateral direction by means of the cam portion 32*a* that changes its abutting position with respect to the piston shaft 31*h* in response to rotational movement of the cam gear 32. The piston member 31*e* reciprocates in the lateral direction together with the piston shaft 31*h*. When the piston member 31*e* moves leftward, pressure is generated in a left-hand pressure chamber 31*k* to close the valve 31*g* to thereby discharge the ink or air therein from the discharge port 31*b* into the waste container 33. At this time, the volume of a right-hand pressure chamber 31*m* increases to generate a negative pressure therein. This negative pressure causes the ink or air to be sucked through the suction port 31*a*. On the other hand, when the piston member 31*e* moves rightward, the ink or air in the right-hand pressure chamber 31*m* moves to the interior of the left-hand pressure chamber 31*k* through the pore 31*f.*

Next, operations of the present invention will be described.

Recording Operation

In a recording operation, the host computer first expands image data to be transmitted to the recording device section 2. The control means 25 controls the movement of the carriage 19 in the main scanning direction, the transfer of the recorded media S in the subscan direction by the pair of transfer rollers 13 and discharge rollers 14, and the recording head 20*a*, based on the image data. The recording head 20*a* ejects ink droplets of different colors from the nozzle 44 based on image gradation process (overlapping of color dots), to record color images on the recorded media S.

When the photosensor 12 detects the trailing end of the recorded medium S, after the recording on the trailing end has been completed, the pair of discharge rollers 14 discharge that recorded medium S from the discharge port 4*b*.

Recovery Operation

After the recording operation has been suspended for a predetermined period or more after power-on of the recording apparatus, the control means 25 automatically start a recovery operation for removing a thickened ink or bubbles from the nozzle in the recording head 20*a*. Further, when non-uniform or blurred colors or the like appear in the recorded image, an operation button (see FIG. 1) is pressed to allow the control means 25 to start the recovery operation in the same manner.

In the recovery operation, the control means 25 first checks whether or not the position detector 58 of the suction path switching mechanism 56 has detected the position indicating member 56*a*. When the position detector 57 has detected the position indicating member 56*a,* the control means moves the carriage 19 leftward, that is, in the direction of the arrow 35 to rotationally move the switching lever 34 in the direction of the arrow 35. This establishes a state where the position detector 58 has detected the position indicating member 56*a,* that is, the suction passage switching state shown in FIG. 8. After assuring that the position detector 58 has detected the position indicating member 56*a,* the control means 25 moves the carriage 19 in such a manner that the recording head 20*a* abuts against the cap member 38*a* and that the general suction port 53 abuts against the cap member 54, as shown in FIGS. 5, 7, and 8. Subsequently, the control means 25 rotates a motor 60 (see FIG. 4) clockwise to rotate the cam gear 32 via the gear 59. The suction pump 31 thus sucks a thickened ink or air from the nozzle 44 in the recording head 20*a* and discharges it into the waste container 33.

One rotation of the cam gear 32 causes the piston member 31*e* of the suction pipe 31 to execute one cycle of suction and discharge. The number of rotations of the cam gear 32 depends on the magnitude of the negative pressure required to recover the ejection of the recording head 20*a*.

Ink Refilling Operation

The control means 25 counts the number of ink droplets ejected from the recording head 20*a,* for each ink color. After at least one of the count values for the ink colors has reached a predetermined value, when the recording operation on the recorded medium S is completed and this medium is then discharged, the control means 25 starts the operation of refilling the storage ink tank 20 with the ink from the refilling ink tank 22 (see FIG. 1).

In the ink refilling operation, the control means 25 first checks whether or not the position detector 57 of the suction passage switching mechanism 56 has detected the position indicating member 56*a*. When the position detector 58 has detected the position indicating member 56*a,* the control means moves the carriage 19 leftward, that is, in the direction of the arrow 35 to rotationally move the switching lever 34 in the direction of the arrow 35. This establishes a state where the position detector 57 has detected the position indicating member 56*a,* that is, the suction passage switching state shown in FIG. 6. After assuring that the position detector 57 has detected the position indicating member 56*a,* the control means 25 moves the carriage 19 in such a manner that the recording head 20*a* abuts against the cap member 38*a* and that the general suction port 54 abuts against the cap member 54, as shown in FIGS. 5, 6, and 7. Subsequently, the control means 25 rotates the motor 60 (see FIG. 4) clockwise to rotate the cam gear 32 via the gear 59. The suction pump 31 thus sucks air from the storage ink tank 20 via the gas transmitting member 48 and discharges it into the waste container 33.

Since the suction pump 31 sucks air from the storage ink tank 20, the interior of the storage ink tank 20 is set at negative pressure. Then, the supplying means 21 connects the refilling ink tank 22 (see FIG. 1) to the storage ink tank 20 as shown FIG. 7. Thus, the negative pressure in the storage ink tank 20 causes the ink in the refilling ink tank 22 to be sucked to the interior 41 of the storage ink tank 20. The ink flowing to the interior 41 of the storage ink tank 20 permeates through the ink absorber 41*a,* composed of a solid of small cells that are in communication with one another. As the permeation proceeds, the level 41*b* of the ink rises. Since the rising speed of the level 41*b* of the ink depends on the suction force of the suction pump 31, it is set at an appropriate value depending on the rotation speed of the cam gear 32. When the level 41*b* of the ink reaches the gas transmitting member 48, the ink refilling is automatically stopped because the gas transmitting member 48 does not transmit liquids such as inks therethrough.

The storage ink tanks 20 (20Y, 2M, 20C, and 20K) for the respective colors are simultaneously refilled with the inks from the corresponding refilling ink tanks 22 (22Y, 22M, 22C, and 22K). Then, the refilling of the storage ink tanks 20 (20Y, 2GM, 20C, and 20K) is automatically sequentially stopped starting with the ink tank in which the level 41*b* of the ink reaches the gas transmitting member 48 earliest.

In this manner, air can be sucked from the storage ink tanks 20 (20Y, 2GM, 20C, and 20K) through the one cap member 54, and the storage ink tanks 20 (20Y, 2GM, 20C, and 20K) can be simultaneously refilled with the inks. This eliminate the need to install the suction port 53 or the cap member 54 in each of the storage ink tanks 20 (20Y, 2GM, 20C, and 20K), thereby reducing the size and weight of the components of the cap device section 30 of the carriage 19. Further, the device for setting the interior of the storage ink tanks 20 (20Y, 2GM, 20C, and 20K) at negative pressure can be made very reliable.

Moreover, since, during the ink refilling operation, the storage ink tank 20 is inclined as shown in FIG. 7, a portion 41*b* of the ink absorber 41*a* located inside the ink tank 20 fails to absorb the ink. After the ink refilling operation, when the storage ink tank 20 returns to its horizontal position as shown in FIG. 41 the ink permeates through the portion 41*b,* so that the level 41*b* in FIG. 7, which has covered the surface of the gas transmitting member 48, moves downward away from the member 48 as shown in FIG. 4. Due to the characteristics of the gas transmitting member 48, when the gas transmitting member 48 is always in contact with the ink and if its functions may be degraded such that it transmits the ink therethrough, then the ink can be effectively separated from the surface of the gas transmitting member 48 while the ink refilling operation is not being performed.

The suction pump 31 according to the present embodiment has both the function as suction means for sucking the ink to recover the recording head 20*a* and the function as a suction means for sucking air from the storage ink tank 20 for the ink refilling operation. Thus, compared to a case where a plurality of suction pumps are included to achieve these functions, the present embodiment can substantially simplify the configuration and reduce the price of the entire apparatus. Further, the negative pressure exerted to the interior of the storage ink tank 20 during the ink refilling operation is set at such a value that prevents the ink in the nozzle from being drawn into the storage ink tank 20. During the ink refilling operation, the ink ejecting port may be closed by the cap member.

Further, if air flows in a portion of the ink channel between the storage ink tank 20 and the refilling ink tank 22, it can be discharged through the gas transmitting member 48 to allow the ink refilling to be executed again. Moreover, since the negative pressure is used to execute the ink suction and refilling, the ink refilling can be achieved despite a difference in ink head between the storage ink tank 20 and the refilling ink tank 22.

If the ink suction and refilling is executed without using the gas transmitting member 48, when air flows in the storage ink tank 20 through the nozzle 44 or the like, the following must be carried out after the ink refilling operation: the ink is sucked through the nozzle 44, the entering air is discharged, and ink meniscus is formed at the ink ejecting port. Accordingly, an extra amount of time is required and an unwanted amount of waste ink results. Even if the nozzle is closed by a cap during the ink refilling operation, if any space is present in the cap, air in the space flows in the storage ink tank 20 through the nozzle 44, resulting in a similar disadvantage.

FIGS. 9 to 12 are views useful in explaining forms of the storage ink tank 20 and the ink supplying means 21 according to the present invention.

Figure 9:
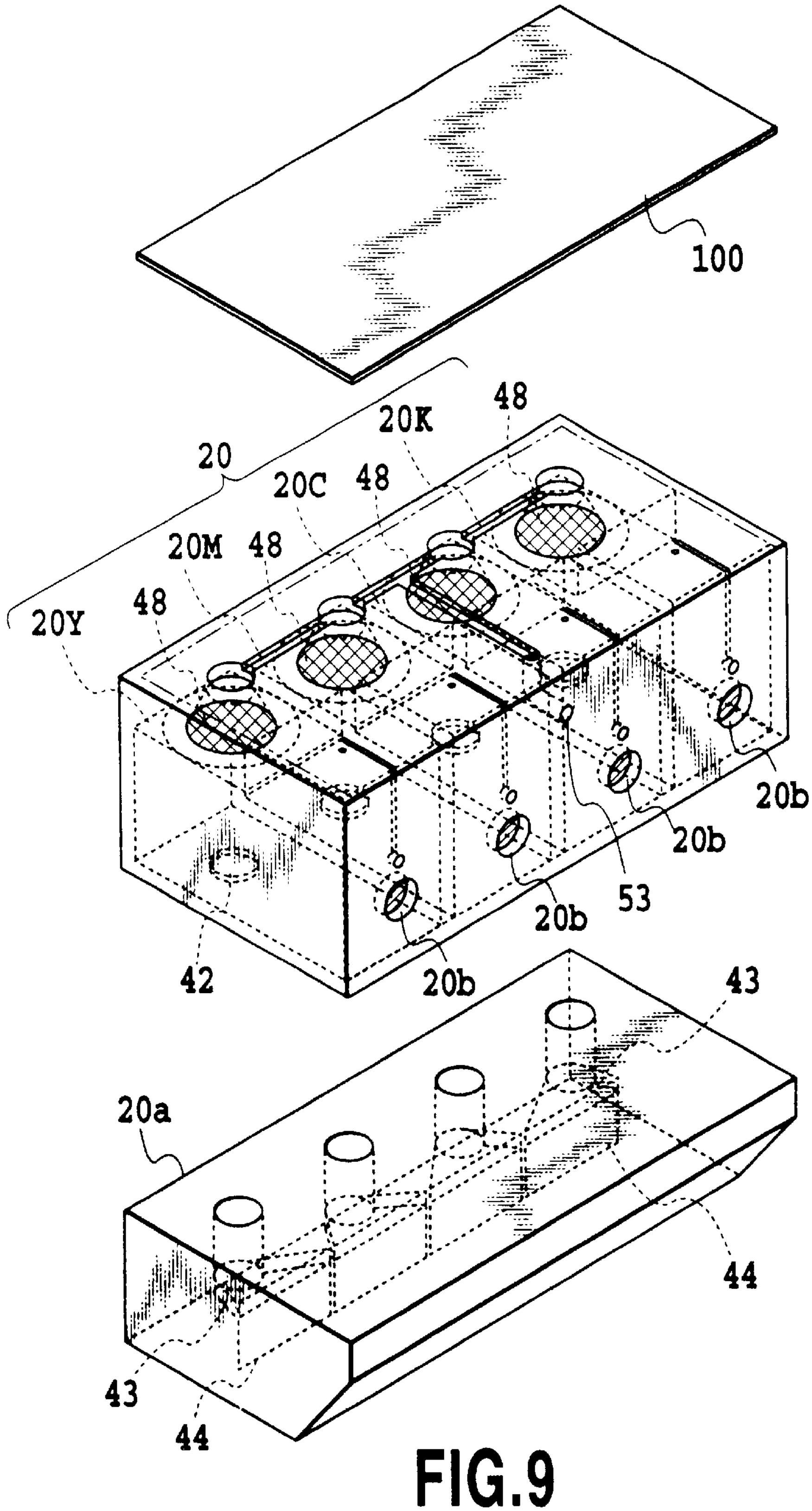
FIG. 9 is an exploded perspective view of the storage ink tank.
Figure 10:
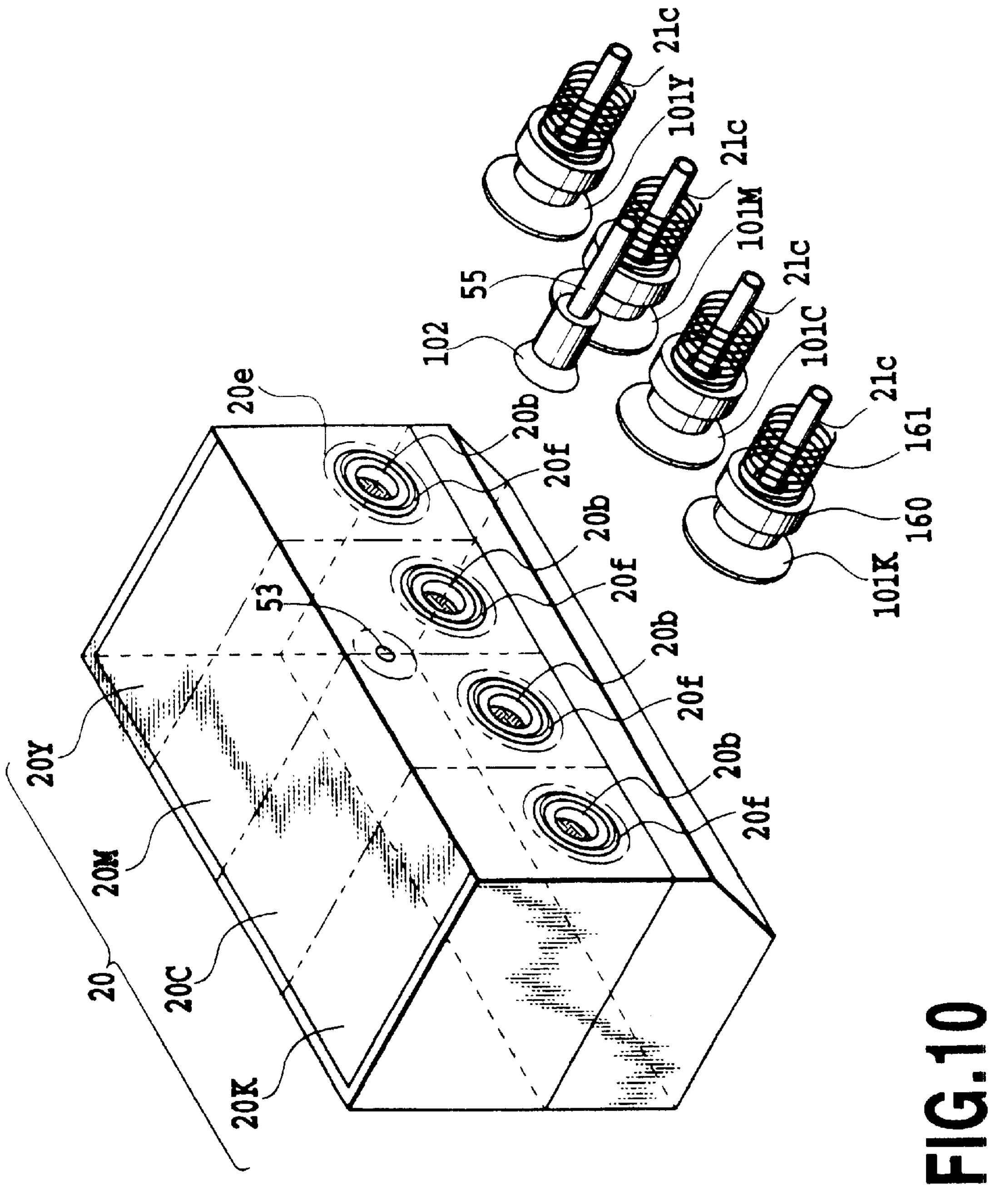
FIG. 10 is a perspective view of the storage ink tank in FIG. 9.

In this example, the general suction port 53 and the ink intake port 20*b* are formed in a side of the storage ink tank 20, as shown in FIGS. 9 and 10. Grooves in the top surface of the storage ink tank 20 main body and a cover member 100 coupled to the same top surface form an air discharging path between each of the ink tanks 20Y, 20M, 20C, and 20K and the general suction port 53. The ink tanks 20Y, 20M, 20C, and 20K each include the gas transmitting member 48 as in the above described embodiment. The storage ink tank 20 is engaged with a recording head 20*a* similar to that in the above described embodiment.

Figure 11:
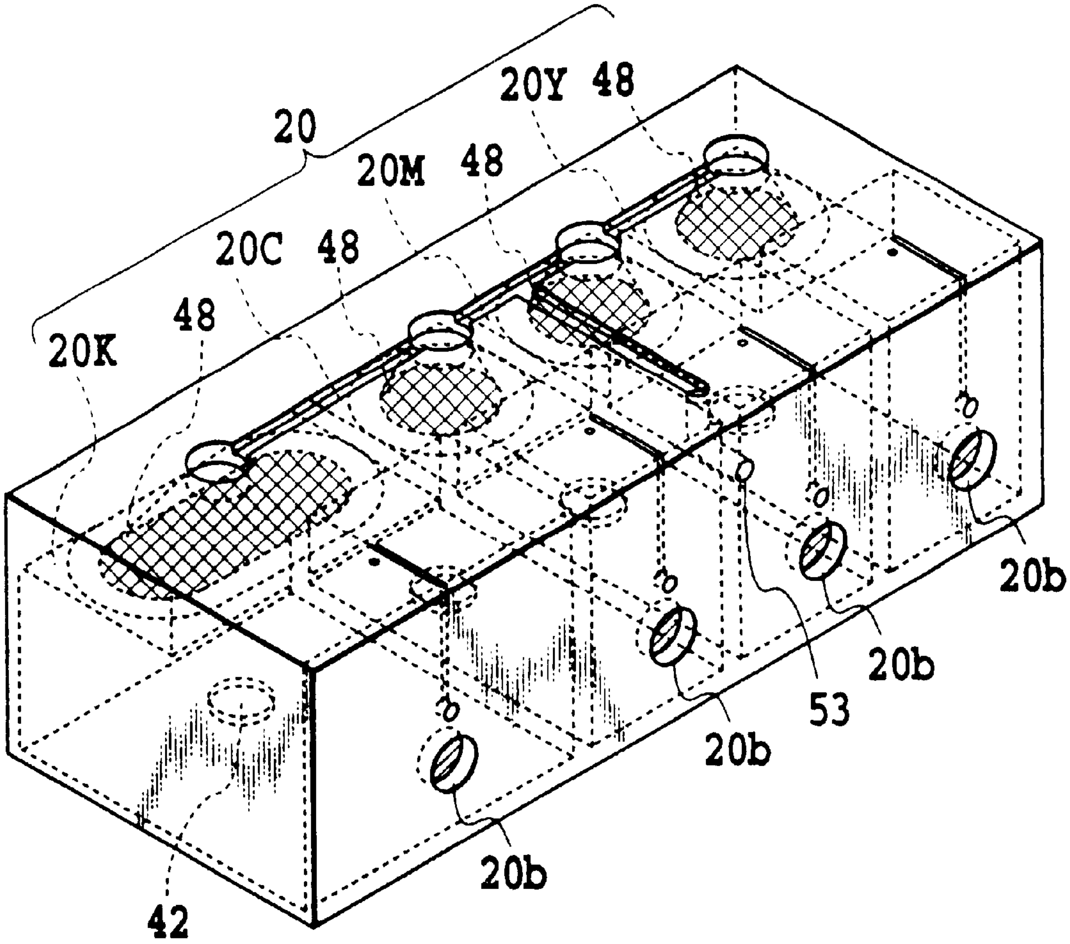
FIG. 11 is a perspective view useful in explaining a variation of the storage ink tank in FIG. 9.

FIG. 11 shows an example of a configuration in which the black ink tank 20K has a larger volume than the other ink tanks 20Y, 20M, and 20C. In this example of a configuration, the gas permeating member 48 provided in the ink tank 20K is set larger than the others so that refilling with the black ink is facilitated by smoothly sucking air from the ink tank 20K through the relatively large gas permeating member 48.

In FIG. 10, reference numerals 1.01Y, 101M, 101C, and 101K denote supplying joints which can each be connected to the ink intake port 20*b* in the corresponding one of the ink tanks 20Y, 20M, 20C, and 20K and which are connected to the tube 21*a* similarly to the supplying means 21Y, 21M, 21C, and 21K in the above described embodiment. Reference numeral 102 denotes a suction joint which can be connected to the general suction port 53 and which is connected to the conduit 55 similarly to the cap member 54 in the above described embodiment.

Figure 12:
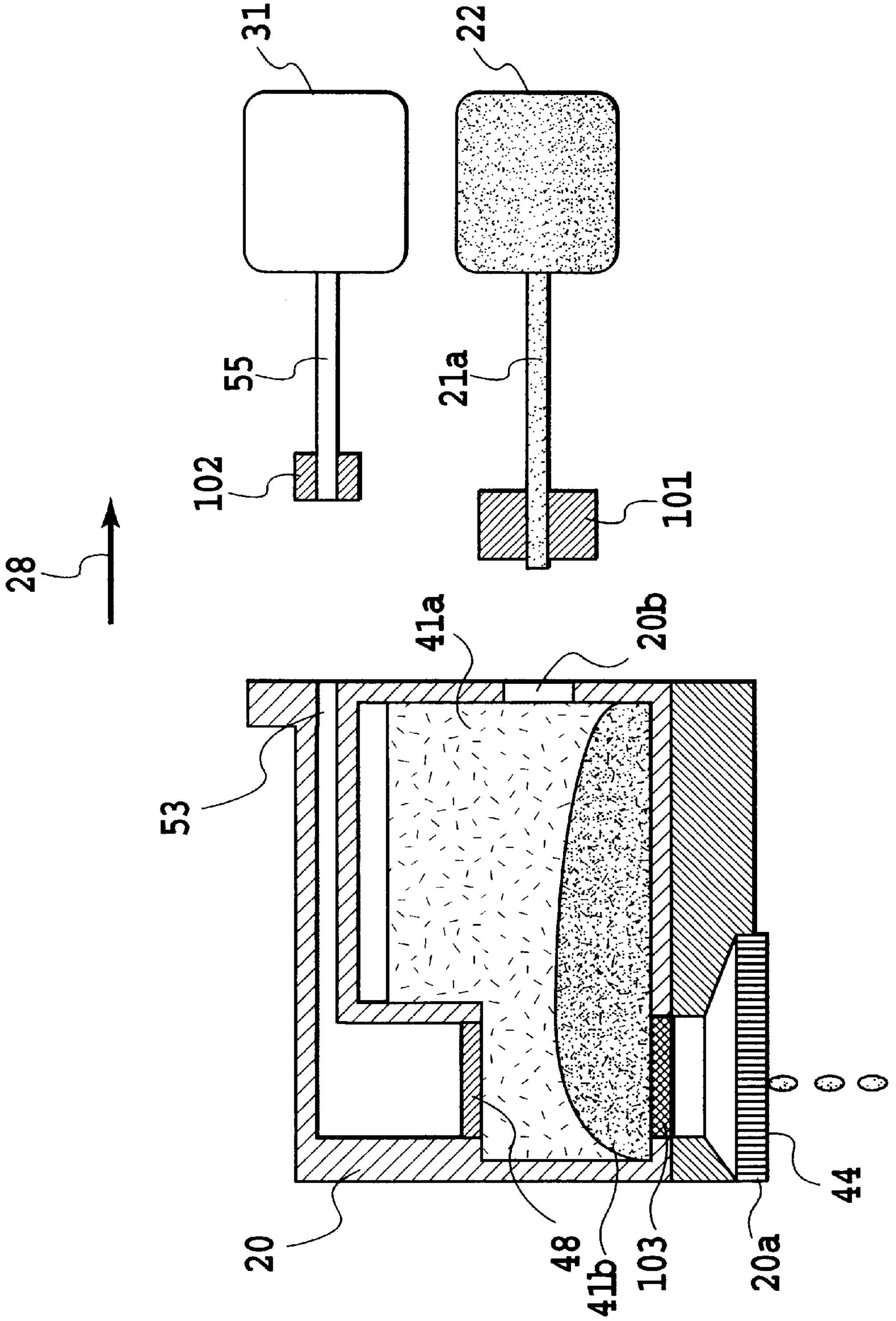
FIG. 12 is a schematic view showing the configuration of an ink refilling system connected to the storage ink tank in FIG. 9.
Figure 13:
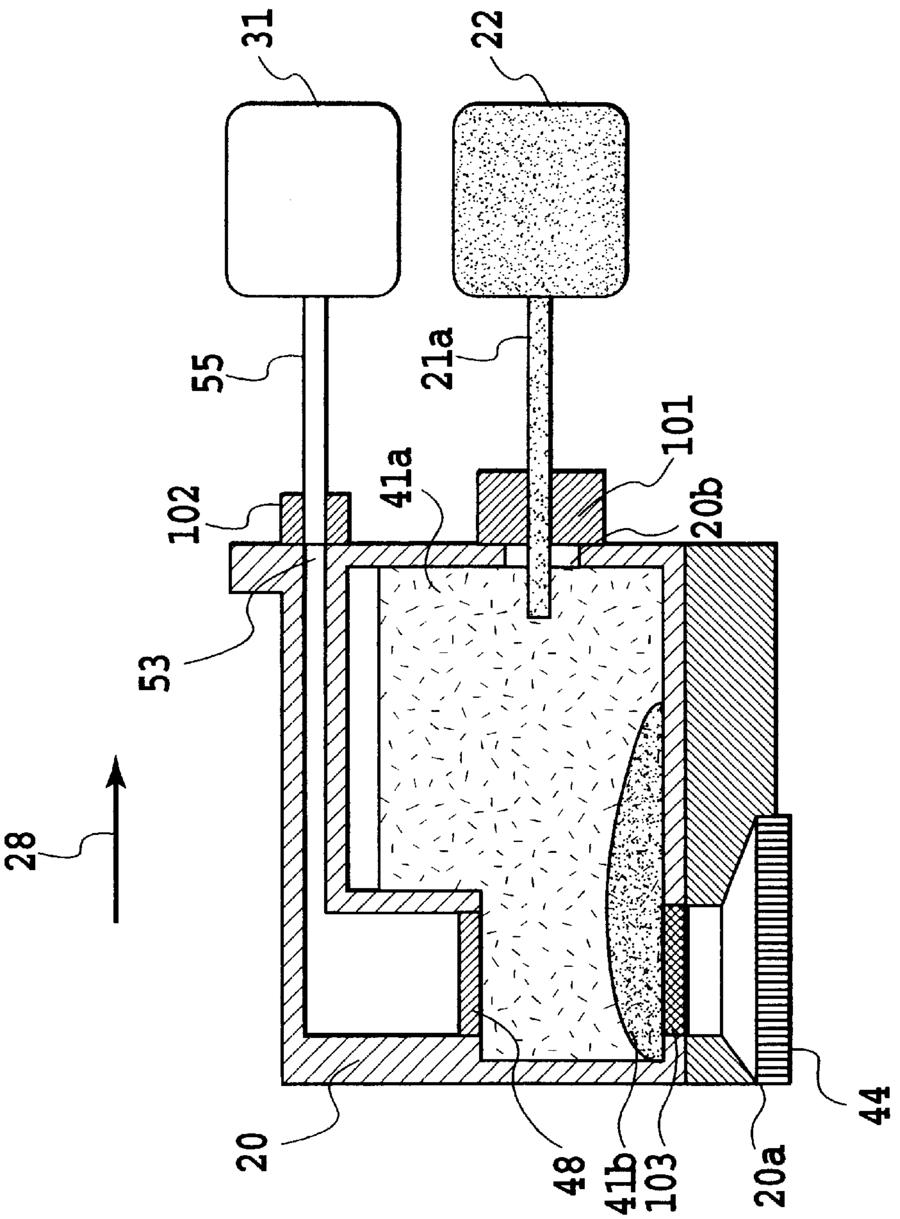
FIG. 13 is a view useful in explaining the connection between the storage ink tank and ink refilling system both shown in FIG. 12.

FIG. 12 is a view useful in explaining the locational relationship between the storage ink tank 20 on the carriage 109 and the joints 101 (101Y, 101M, 101C, and 101K) and 102 in the apparatus main body. The ink intake port 20*b* and the general suction port 53 are connected to the joints 101 and 102, respectively, when the carriage 19 is moved in the direction of the arrow 28. In FIG. 12, the configurations of the ink supplying system between the supplying joint 101 and the refilling ink tank 22 and of the suction system between the suction joint 102 and the suction pump 31 are simplified. Reference numeral 103 denotes a filter provided in the channel 42.

FIGS. 13 to 17 are views useful in explaining the ink refilling operation.

Figure 14:
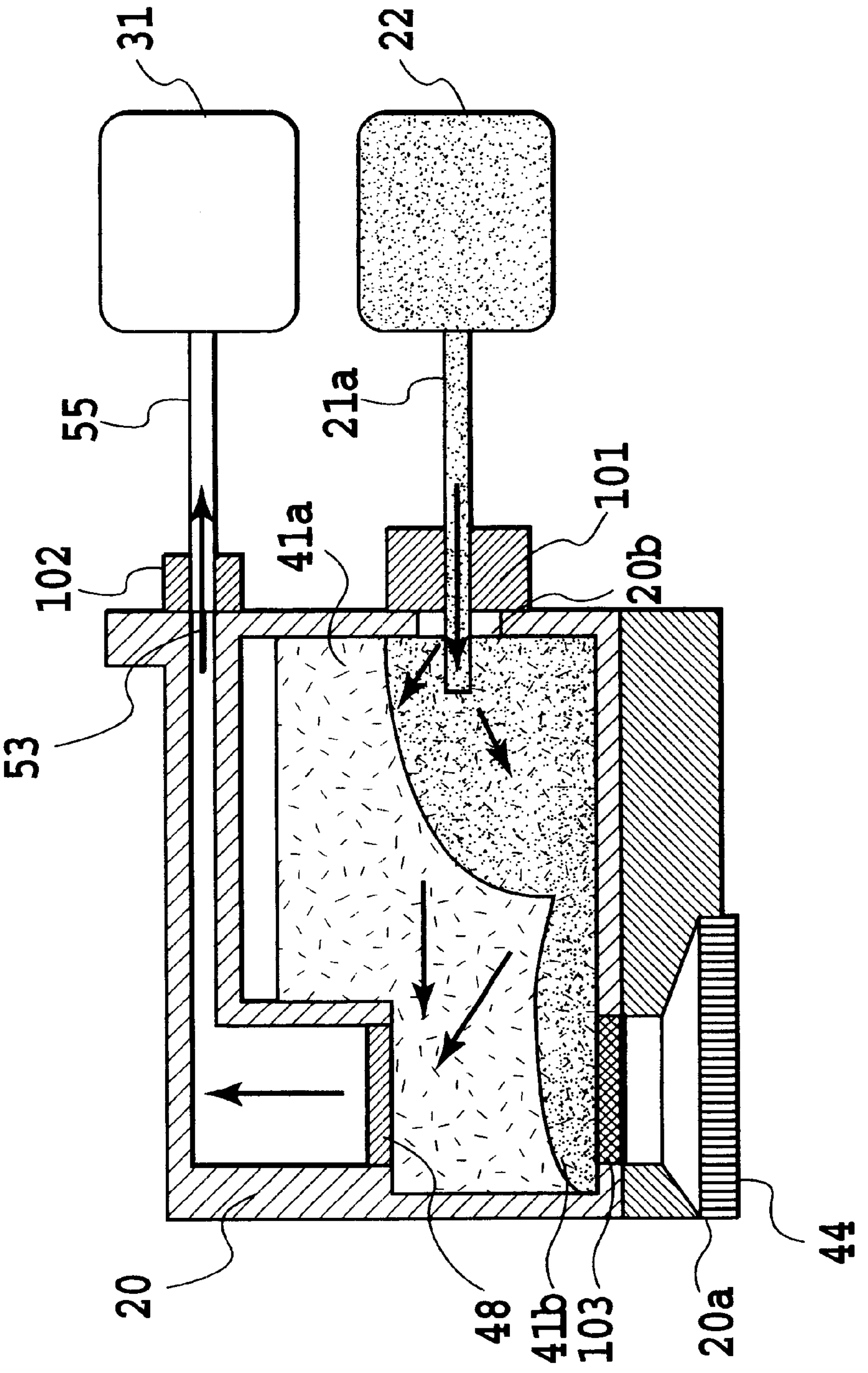
FIG. 14 is a view useful in explaining the ink refilling system in FIG. 12, showing that it is executing ink refilling.
Figure 15:
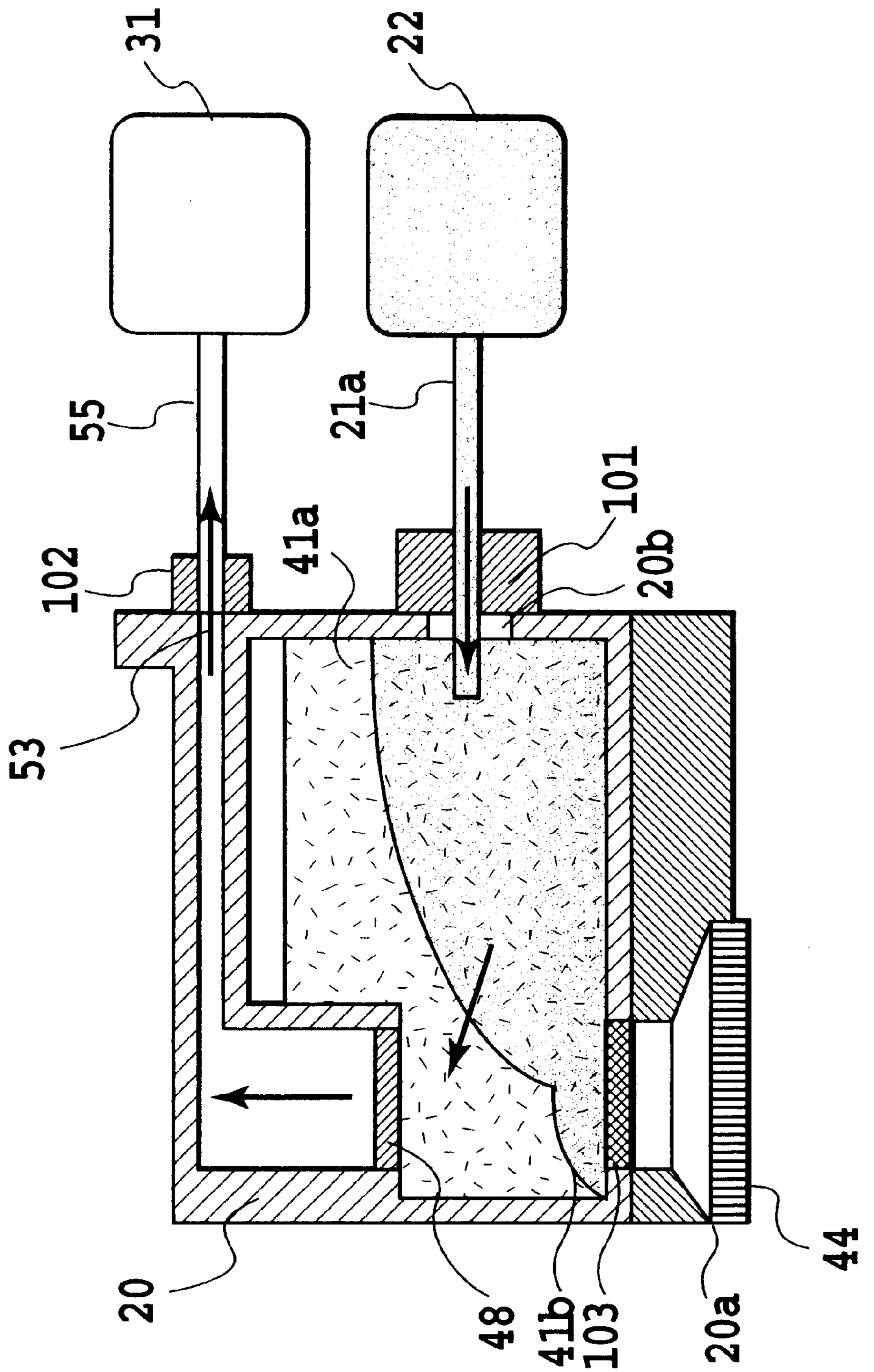
FIG. 15 is a view useful in explaining the ink refilling system in FIG. 12, showing that it is executing ink refilling.
Figure 16:
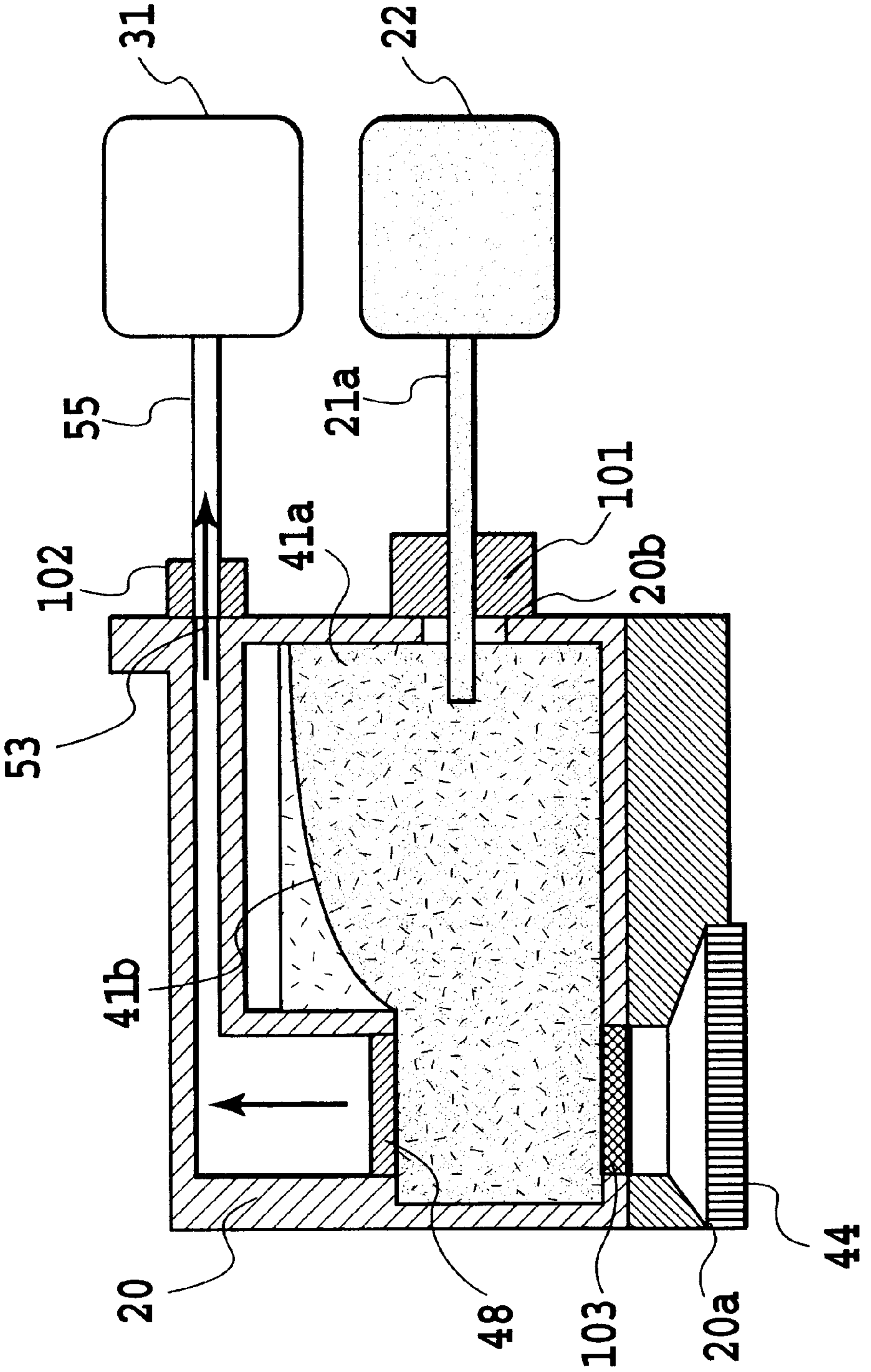
FIG. 16 is a view explaining the ink refilling system in FIG. 12, showing that it stops ink refilling.
Figure 17:
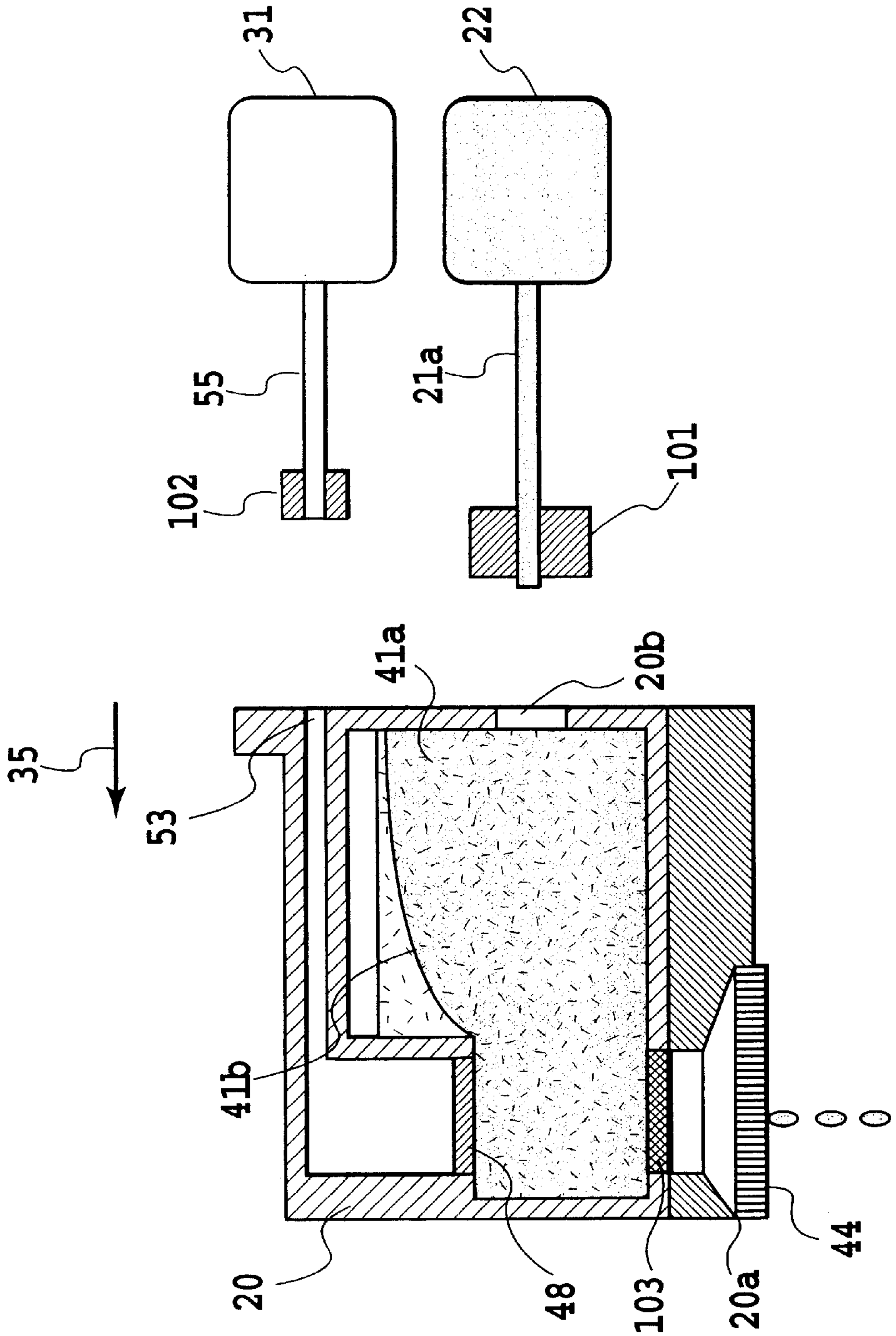
FIG. 17 is a view explaining the ink refilling system in FIG. 12, showing a state after it has stopped ink refilling.

In the ink refilling, the carriage 19 is first moved in the direction of the arrow 28 to connect the ink intake port 20*b* and the general suction port 53 are connected to the joints 101 and 102, respectively. Subsequently, a suction operation of the suction pump 31 causes the air in the storage ink tank 20 to be sucked through the gas transmitting member 48. Negative pressure is exerted in the storage ink tank 20. The negative pressure in the storage ink tank 20 causes the ink in the refilling ink tank 22 to be sucked to the interior 41 of the storage ink tank 20, as shown in FIGS. 14 and 15. When the level 41*b* of the ink in the storage ink tank 20 reaches the gas transmitting member 48, as shown in FIG. 16, since the latter not transmitting liquids such as inks therethrough, the ink refilling is automatically stopped. Subsequently, as shown in FIG. 17, the carriage 19 is moved in the direction of the arrow 35 to separate the ink intake port 20*b* and the general suction port 53 from the joints 101 and 102, respectively, to thereby complete the series of refilling operations.

FIGS. 18 to 22 are views in explaining a configuration a first embodiment of a joint device according to the present invention.

The joint device according to the present invention enables the connection and separation of the ink channel between the refilling ink tank 22 and the storage ink tank 20, and comprises the ink supplying means 21. When connected to the ink intake port 20*b* formed in the storage ink tank 20, so as to close it, the ink supplying means 21 opens the ink supplying port 21*b* for communication to supply the ink. When separated from the ink intake port 20*b*, the ink supplying means 21 closes the ink supplying port 21*b* to hinder the ink from leaking from the refilling ink tank 22 or drying.

Figure 18:
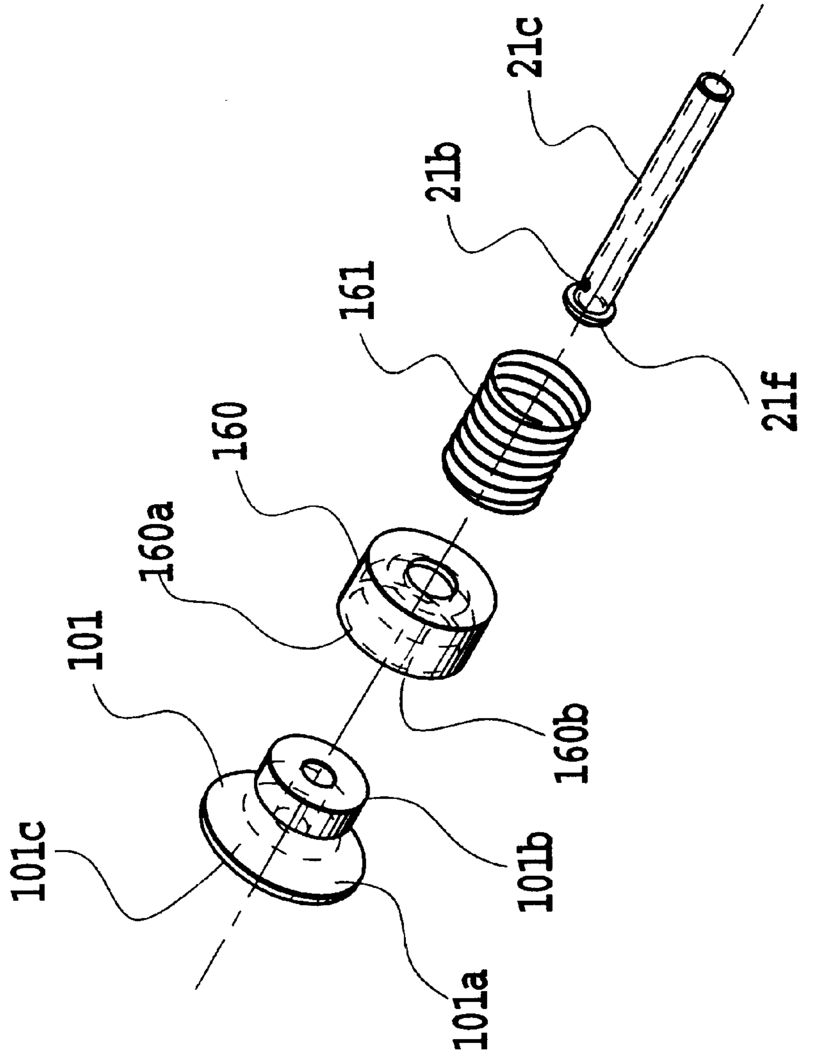
FIG. 18 is a view showing a configuration of a joint according to a first embodiment of the present invention.

As shown in FIG. 18, in the joint device of the present invention, the ink supplying means 21 comprises the hollow needle 21*c*, the joint 101, a ring 160, and a spring 161.

The hollow needle 21*c* is composed of a hollow member extended integrally or separately from the refilling ink tank 22, and includes the ink supplying port 21*b* formed in an outer peripheral side thereof near a tip portion thereof and a stopper 21*f* for preventing slip-out of the joint 101 formed at the tip and acting as closing means. The joint 101 is composed of a very elastic material such as rubber and is shaped as a combination of a sucker-shaped portion 101*a* formed in a connection surface 20*e* of the storage ink tank 20 and which is very significantly deformed upon connection and a relatively thick cylindrical portion 101*b* formed on the opposite side. The joint 101 can be fitted in the hollow needle 21*c* in such a manner as to be slidably tightened.

The ring 160 has a generally L-shaped cross section in so as to cover the cylindrical portion 101*b* of the joint 101 and forms an abutting portion 160*b* abutting against the sucker-shaped portion 101*a* of the joint 101. Further, the spring 161 is shaped like a coil and urges a side of the ring 160 along the hollow needle 21*c*. Of course, the spring 161 is not limited to the coil shape, but springs of other similar appropriate shapes or configurations may be used.

Figure 19:
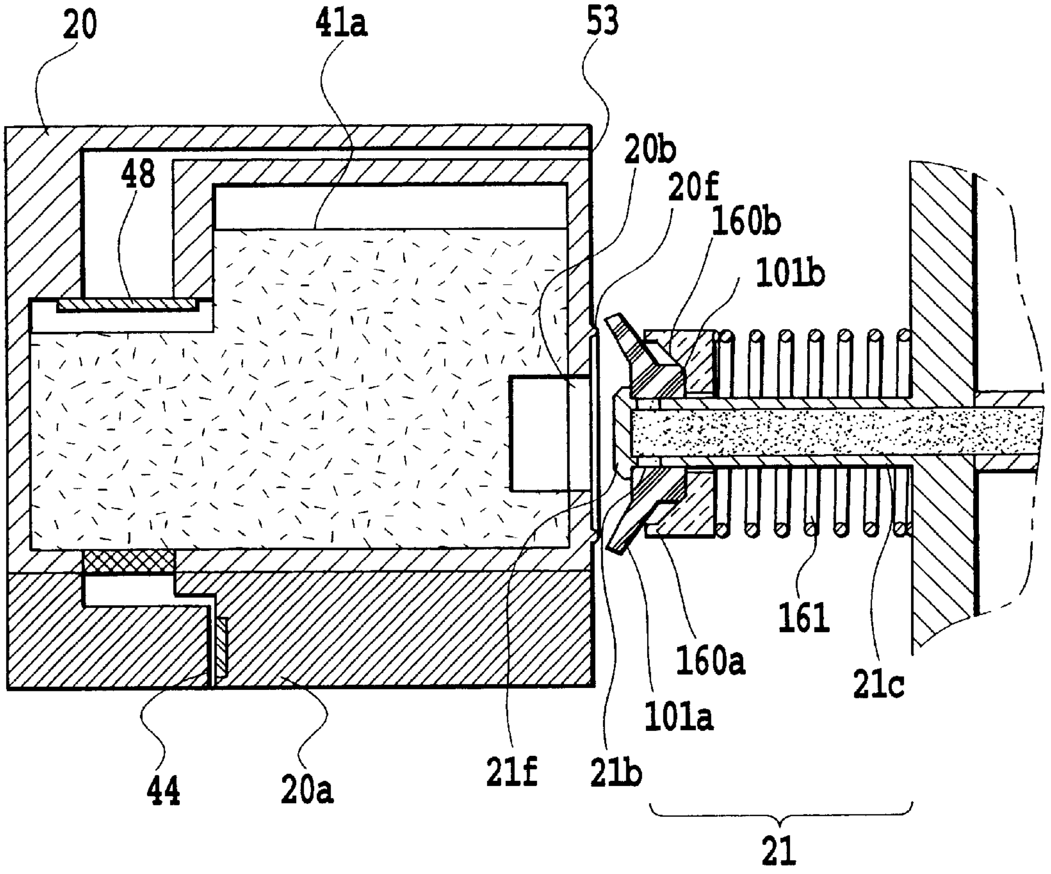
FIG. 19 is a view useful in explaining how the joint in FIG. 18 separates the storage ink tank from ink supplying means.
Figure 20:
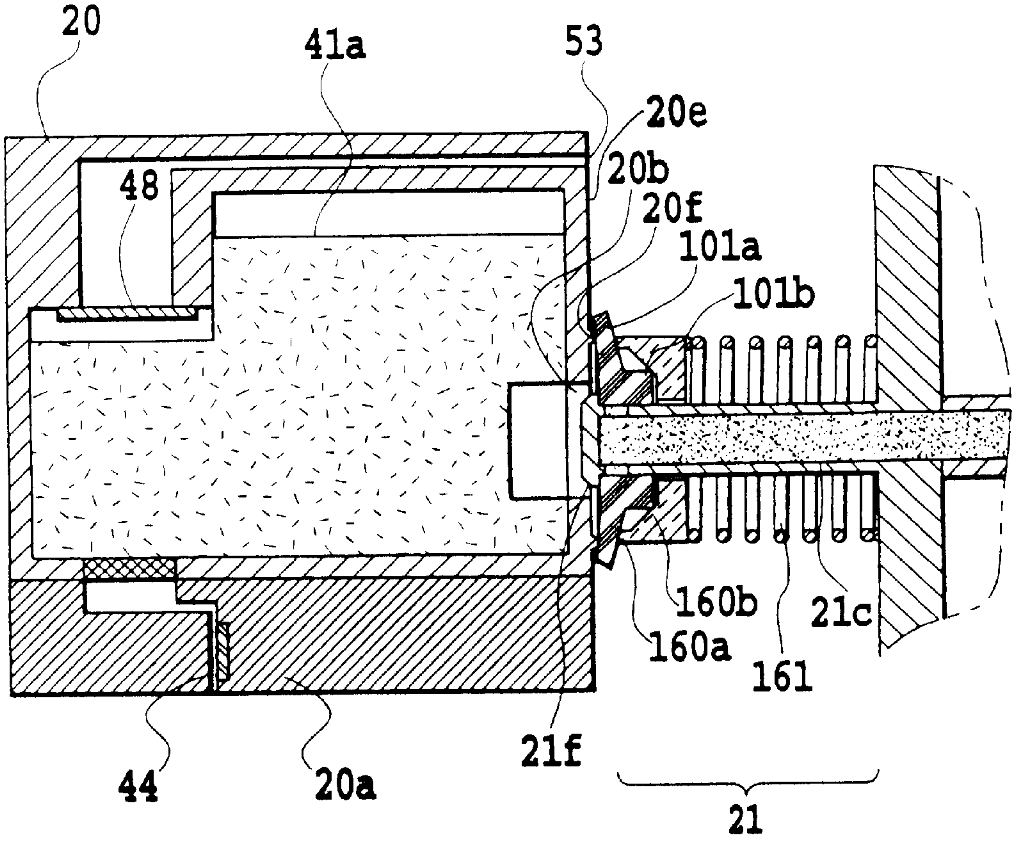
FIG. 20 is a view useful in explaining how the joint in FIG. 18 starts to connect the storage ink tank to the ink supplying means.

FIGS. 19 and 20 are views useful in explaining an operation of the joint device of the present invention. First, the operation performed to connect the joint 101 to the ink tank will be explained.

FIG. 19 is a view showing that the ink supplying means 21 is separated from the ink intake port 20*b* in the storage ink tank 20. The joint 101 is sandwiched between the abutting portion 160*b* of the ring 160, urged by the spring 161, and the stopper 21*f* of the hollow needle 21*c*; it is compressed in such a manner as to tighten the hollow needle 21*c*. Since the hollow needle 21*c* is tightened in this manner, the ink supplying port 21*b* is closed by the joint 101 to preclude the ink in the hollow needle 21*c* from leaking or drying. At this time, the sucker-shaped portion 101*a* of the joint 101 is not abutted against the abutting portion 160*a* of the ring 160.

FIG. 20 is a view showing that the ink intake port 20*b* of the storage ink tank 20 starts to connect to the ink supplying means 21. First, when the storage ink tank 20 moves in a connection direction (the right direction of the figure), the neighborhood of an outer periphery of the sucker-shaped portion 101*a* of the joint 101 starts to abut against a recess and projecting portion 20*f* on the connection surface 20*e* of the storage ink tank 20. Then, the sucker-shaped portion 101*a* is deformed and come into abutment with the abutting portion 160*a* of the ring 160. Furthermore, the ring 160 starts to move against the urging of spring 161. At this time, the cylindrical portion 101*b* of the joint 101 and the abutting portion 160*b* of the ring 160 are separated from each other to relieve the compression of the joint 101 and thus the tightening between the joint 101 and the hollow needle 21*c*. Accordingly, the application of a light load, that is, a weak force enables the joint 101 to move rightward in the figure while sliding on the hollow needle 21*c*. Consequently, the hollow needle 21 is inserted into the ink intake port 20*b* in the storage ink tank 20 to open the ink supplying port 21*b*.

Figure 21:
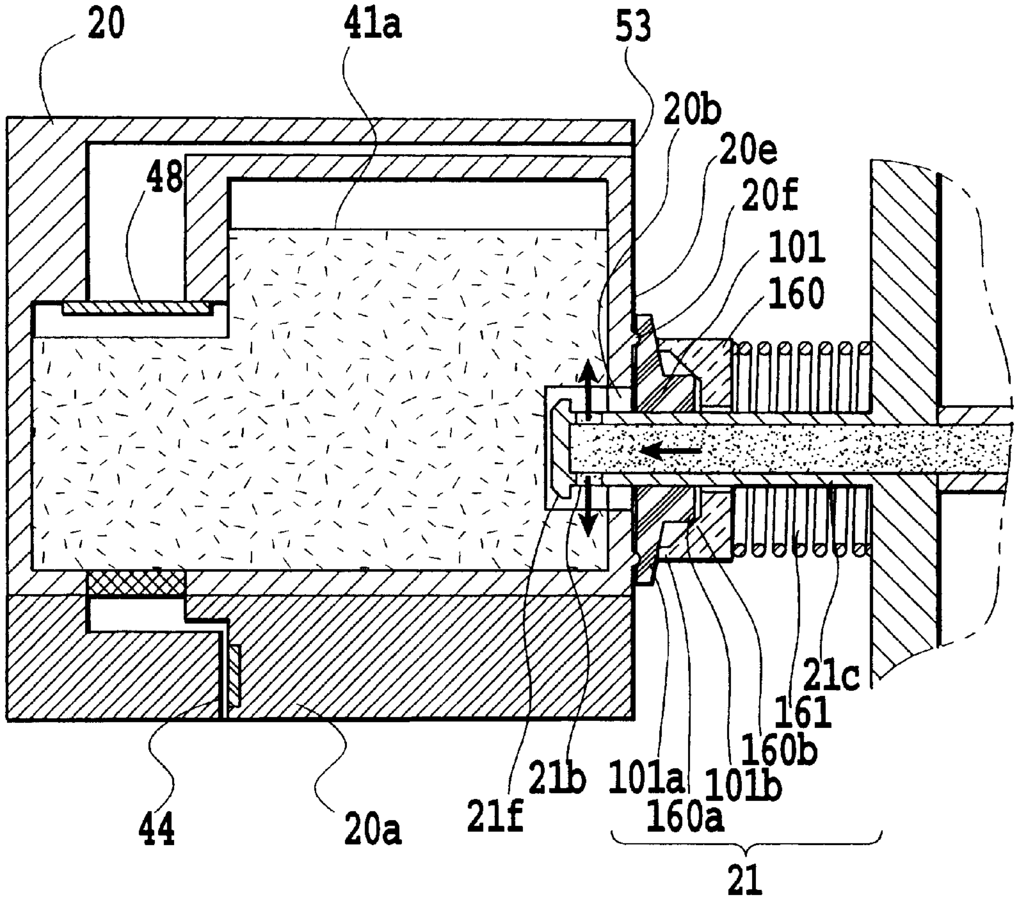
FIG. 21 is a view useful in explaining how the joint in FIG. 18 connects the storage ink tank to the ink supplying means.

FIG. 21 is a view showing the above state, that is, the state where the ink intake port 20*b* in the storage ink tank 20 is connected to the ink supplying means 21. Under these conditions, if negative pressure is applied to the storage ink tank 20 through the suction port 53, the ink is supplied from the ink supplying means 21 to the storage ink tank 20 (the arrow in the figure).

The reverse operation is performed if the joint 101 of the ink supplying means 21 is separated from the storage ink tank 20. Also in this case, the joint 101 is not compressed and slides easily along the hollow needle 21*c,* so that the urging force of the spring 161 is not required to be very strong. When the storage ink tank 20 is separated from the joint 101, the latter has its movement stopped by the stopper 21*f* of the hollow needle 21*c* and is compressed again by the ring 160, to reliably close the ink supplying port 21*b*. As a result, the ink can be prevented from leaking or drying.

Figure 22:
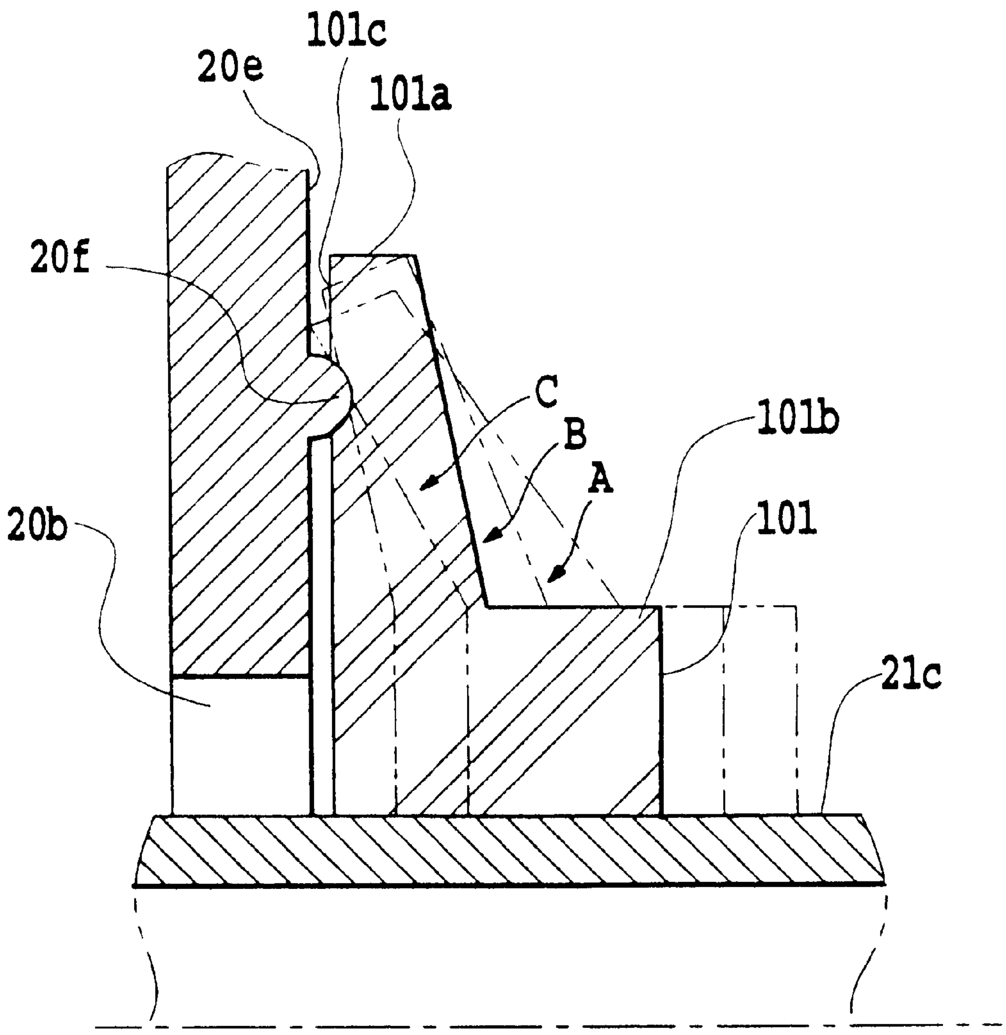
FIG. 22 is a view showing how the storage ink tank and the ink supplying means are operated by the joint in FIG. 18.

With a rib-shaped recess and projecting portion 20*f* formed on the connection surface 20*e* of the storage ink tank 20, as shown in FIG. 22, the sucker-shaped portion 101*a* has, during the connection and separation operations, its abutting surface 101*c* deformed and rubbed by the recess and projecting portion 24*f* as shown in the drawing (A →B→C). Accordingly, attachments such as dirt or inks which adhere to the abutting surface 101*c* are scraped off and cleared to prevent leakage from the joint 101 due to the attachments. In this case, the abutting portion is preferably shaped to have recesses and projections, but it may have projections and grooves in the form of mountains and valleys.

Second Embodiment

Figure 23:
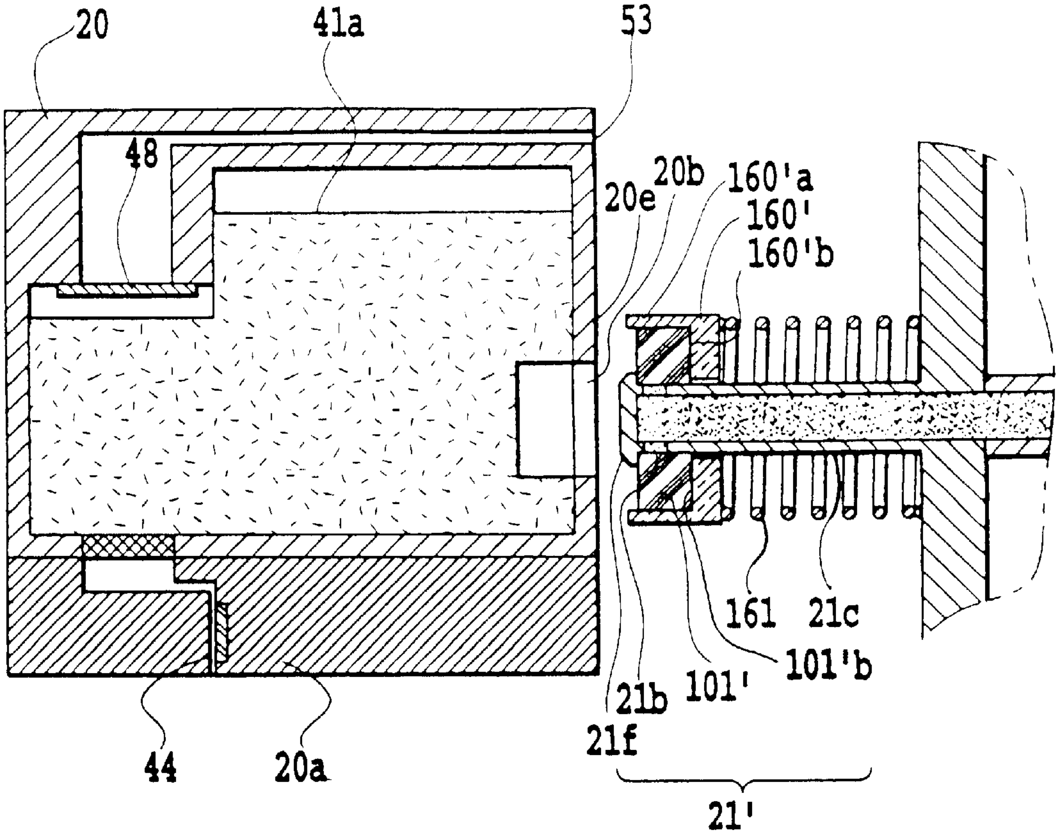
FIG. 23 is a view explaining how a joint according to a second embodiment of the present invention separates the storage ink tank from ink supplying means.
Figure 24:
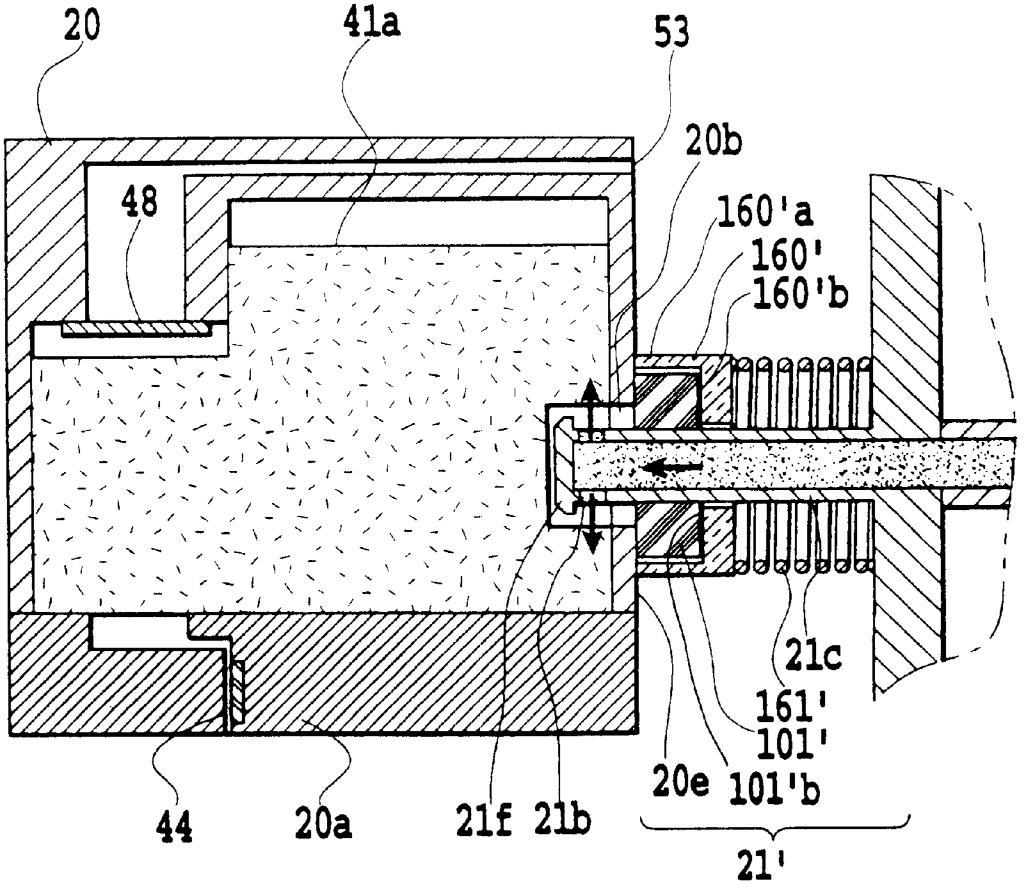
FIG. 24 is a view useful in explaining how the joint according to the second embodiment of the present invention connects the storage ink tank to the ink supplying means.

FIGS. 23 and 24 are views useful in explaining a second embodiment of the joint device according to the present invention.

As shown in the drawings, substantially similarly to the first embodiment, the joint device according to the second embodiment of the present invention is composed of ink supplying means 21'. In this example, the ink supplying means 21' comprises the hollow needle 21*c,* a joint 101', a ring 160', and the spring 161. Although the joint 101' and the ring 160' are shaped slightly differently from those in the first embodiment, the hollow needle 21*c* and the spring 161 have almost the same shapes.

First, the joint 101' is composed of a very flexible material such as rubber and has a simple cylindrical shape. The joint 101' is fitted on the hollow needle 21*c* in such a manner as to be slidably tightened. Further, the ring 160' is shaped like a cup with a generally L-shaped cross section covering the joint 101' and forms an abutting portion 160' a abutting an outer periphery of the joint 101' and an abutting portion 160'*b* abutting a side 101'*b* of the joint 101'. Furthermore, the spring 161 is shaped like a coil and urges a side the ring 160' along the hollow needle 21*c*. Of course, the spring 161 is not limited to the coil shape, but it may be a plate spring, a beleville spring, or other springs that effect action similar to that of the spring 161.

Next, the operation performed to connect the joint 101' to the ink tank will be explained.

FIG. 23 is a view showing that the ink supplying means 21' is separated from the ink intake port 20*b* of the storage ink tank 20. The joint 101' is sandwiched between the abutting portion 160'*b* of the ring 160', urged by the spring 161, and the stopper 21*f* of the hollow needle 21*c;* it is compressed in such a manner as to tighten the hollow needle 21*c*. At this time, the diametrical length of the joint 101' is increased but regulated by the abutting portion 160'*a* of the ring 160' to thereby tighten the hollow needle 21*c*. Accordingly, the ink supplying port 21*b* in the hollow needle 21*c* is closed to prevent the ink in the hollow needle 21*c* from leaking or drying.

Then, when the storage ink tank 20 is moved in the connection direction (the right direction of the figure) so as to connect to the ink supplying means 21', the abutting portion 160'*a* of the ring 160' first abuts against the connection surface 20*e* of the storage ink tank 20. Then, when the ring 160' starts to move along the hollow needle 21*c* against the urging force of the spring 161, the joint 101' and the abutting portion 160'*b* of the ring 160' are separated from each other to relieve the compression of the joint 101' and thus the tightening between the joint 101' and the hollow needle 21*c*. Accordingly, the application of a light load, that is, a weak force enables the joint 101' to move rightward in the figure while sliding on the hollow needle 21*c*. Subsequently, with the connection surface 20*e* of the storage ink tank 20 in tight contact with the joint 101', the joint 101' is moved so as to open the ink supplying port 21*b*.

FIG. 24 shows the above state, that is, the state where the ink intake port 20*b* of the storage ink tank 20 is connected to the ink supplying means 21'. Then, if negative pressure is applied to the storage ink tank 20 through the suction port 53, the ink is supplied from the ink supplying means 21' to the storage ink tank 20 (the arrow in the figure).

The reverse operation is performed if the joint 101' is separated from the ink intake port 20*b* in the storage ink tank 20. Also in this case, the joint 101' is not compressed and slides easily, so that the urging force of the spring 161 is not required to be very strong. When the storage ink tank 20 is separated from the joint 101', the latter first moves along the hollow needle 21*c,* then has its movement stopped by the stopper 21*f* of the hollow needle 21*c,* and is compressed again by the ring 160, to reliably close the ink supplying port 21*b*. As a result, the ink can be prevented from leaking or drying.

Third Embodiment

Figure 25:
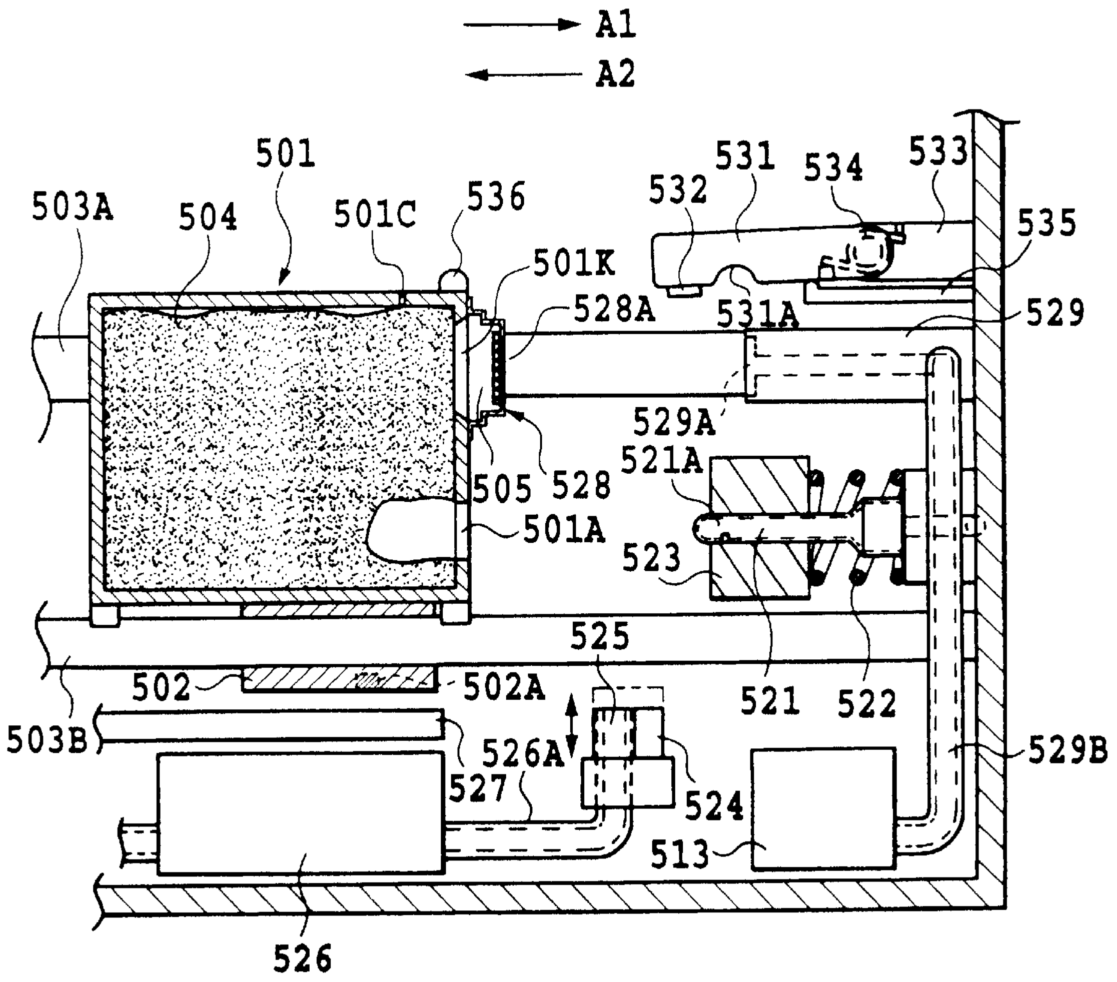
FIG. 25 is a sectional view of an integral part of an ink supplying device of an ink jet recording apparatus of the present invention; the view shows a basic configuration of the ink supplying device and is useful in explaining a third embodiment.
Figure 28:
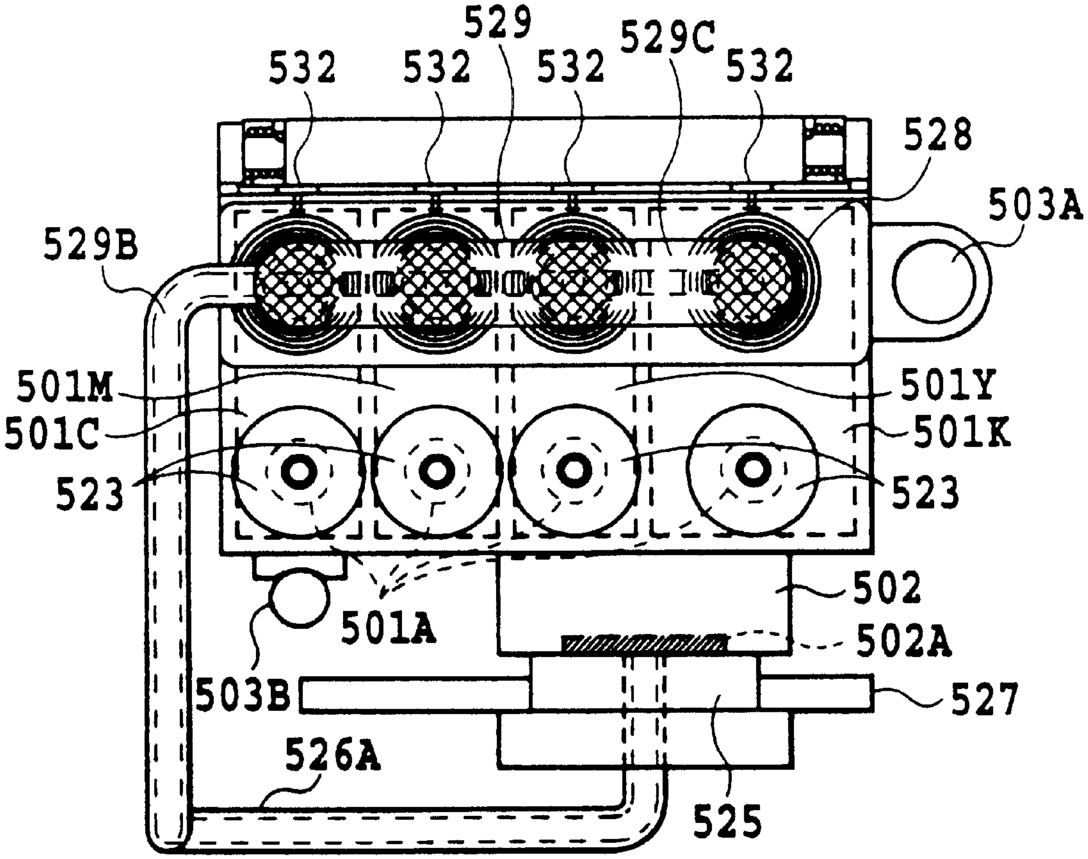
FIG. 28 is a side view of an integral part of FIG. 27.

FIGS. 25 and 28 are views useful in explaining a specific configuration according to a third embodiment of the ink jet recording apparatus having the ink supplying device for implementing the ink supplying method of the present invention.

The present invention provides an ink jet recording apparatus that can record an image on a recorded medium using an ink jet recording head capable of ejecting an ink supplied from an ink tank, the ink jet recording apparatus comprising negative-pressure introducing means capable of introducing negative pressure into the ink tank, ink supplying means for capable of supplying the ink to an interior of the ink tank using the negative pressure in the ink tank, gas-liquid separating means provided in a negative-pressure introducing path located between the ink tank and the negative-pressure introducing means, for transmitting gases therethrough while not transmitting the ink therethrough, and isolation means capable of separating a middle site of the negative-pressure introducing path located between the gas-liquid separating means and the negative-pressure introducing means, in which when the ink tank is separated from the ink supplying position, the gas-liquid separating means is moved to a first position where it is not in contact with the ink, and in which when the ink tank is moved to the ink supplying position, the gas-liquid separating means is driven to a second position for an ink supply.

In such an ink jet recording apparatus of the present invention, the negative-pressure introducing means comprises a suction pump 513, the ink supplying means comprises a projecting member 521 having a seal member 523, the gas-liquid separating means comprises gas transmitting means 505, and the separating means comprises a movable member 528 or the like, as described below in detail.

FIG. 25 is a view of the ink supplying device of the ink jet recording apparatus of the present invention, showing that an image is being recorded on the recorded medium (not shown).

As shown in the drawing, a sub-ink tank (hereafter referred to as a "sub-tank") 501 allowing the ink to be accommodated therein has a recording head 502 integrally or removably provided thereon for ejecting the ink from a nozzle portion 502A for recording; the subtank 501 and the recording head 502 are reciprocated in the main scan direction (shown by arrows A1 and A2) along guide shafts 503A and 503B extending in parallel at a certain interval. The subtank 501 and the recording head 502 can be removably mounted on a carriage (not shown) configured so as to be guided along the guide shafts 503A and 503B for reciprocation. The subtank 501 has an ink intake port 501A, a suction port 501K, an atmosphere communication port 501C, an ink supplying port (not shown) in communication with the recording head 502, and others all formed therein, and the subtank 501 internally accommodates an ink absorber 504 such as a sponge, a non-woven fabric, an appropriate fibrous material, or other similar materials for absorbing and retaining the ink.

Furthermore, the subtank 501 has the movable member 528 secured to a periphery of the suction port 501K by means of thermal welding or adhesion using an adhesive or the like and formed of an elastic material such as rubber or an elastomer. The movable member 528 has an opening 528A on one side thereof, for example, the outer side and has gas transmitting means 505 attached to an peripheral edge portion of the other side, that is, the inner side by means of thermal welding or adhesion with an adhesive in such a manner as to cover the opening 528A, the gas transmitting means transmitting gases such as air therethrough while not transmitting liquids such as inks therethrough. Preferably, the gas transmitting member preferably comprises a think sheet formed of polytetrafluoroethylene or a similar porous resin material or is composed of porcelain, unglazed pottery, ceramic, or a similar porous material. Furthermore, the gas transmitting member 505 is more effective when subjected to an oil repelling process by applying or coating an appropriate oil repellent agent such as a fluorine compound thereto or thereon.

Further, the apparatus main body has the hollow projecting member 521 secured thereto and a seal member 523 urged in the leftward direction of the figure by the spring 522 and fitted around an outer peripheral portion of the projecting member 521 so as to slip slightly frictionally. The projecting member 521 has a through-hole 521A formed near its tip and which can be closed by the seal member 523. The tip of the hollow projecting member 521 is blocked, while its proximal end is connected to a main ink tank (hereafter referred to as a "main tank") to obtain an ink supply therefrom.

Furthermore, the apparatus main body has a suction pipe 529. The latter has one end formed as an opening 529A and the other end connected to the suction pump 513 via a suction channel 529B. Further, an arm member 531 is journaled to one end of a support member 533 secured to the apparatus main body so that the arm member can be rotationally moved in the vertical direction; the arm member 531 is also urged downward by a spring 534. The arm member 531 has a seal member 532 provided on a tip-side bottom surface of the arm member 531 so as to block an atmospheric-communication port 501C in the subtank 501 during an ink supply, described later. Moreover, the apparatus main body has a stopper member 535 provided under the support member 533, for regulating a lower moving position of the arm member 531 so that a tip of the stopper member 535 can engage with the arm member 531 to hinder it from rotationally moving downward. The subtank 501 also has a projecting portion 536 for moving the arm member 531 upward and downward depending on the movement position of the subtank 501. Furthermore, the arm member 531 is locked when the projecting portion 536 provided on the subtank 501 slips into it; the arm member 531 has a recess portion 531A formed therein for holding the subtank 501.

Further, the apparatus main body has a first and a second cap members 524 and 525 provided along a tip portion of a suction pipe 526A of a suction pump 526 so as to be movable in the vertical direction; the second cap member 525 is connected to a waste tank (not shown) via the suction pipe 526A and the suction pipe 526. A platen 527 for guiding the recorded medium is provided at a location where the recording head 502 records an image. The recorded medium is conveyed by a transfer mechanism (not shown) in the subscan direction, which crosses the main scan direction (shown by the arrows A1 and A2). Accordingly, an image is sequentially formed and recorded on the recorded medium by repeating the main scan of the recording head 502 simultaneously with ink ejection and the conveyance of the recorded medium in the subscan direction. At a location to the left of the home position in FIG. 2, described later, the recording head 502 can reciprocate in the directions of the arrows A1 and A2 as shown in FIG. 25 while ejecting the ink to the recorded medium to recording an image thereon.

Figure 26:
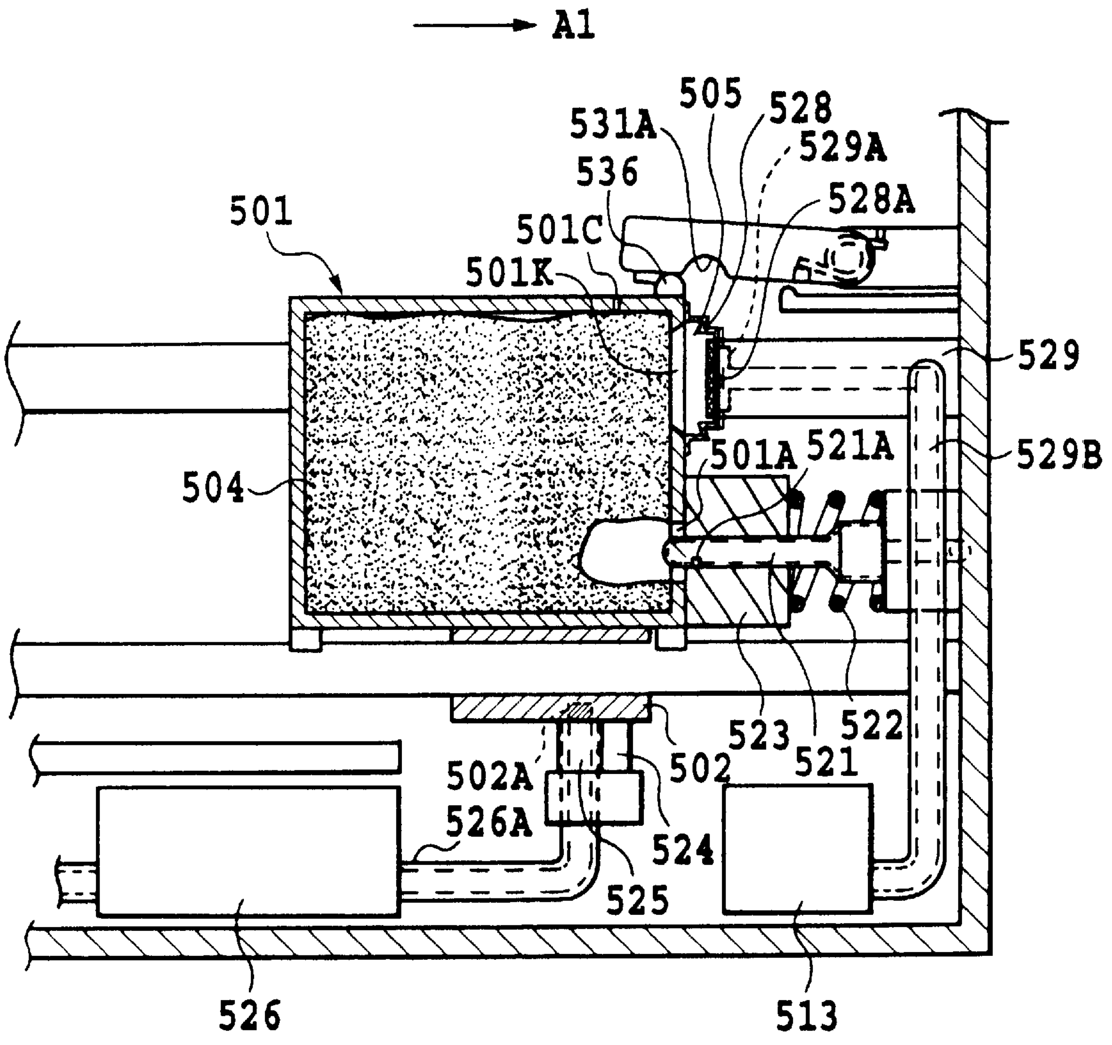
FIG. 26 is a sectional view of an integral part of the present invention; the view shows a home operation and is useful in explaining the third embodiment.

FIG. 26 is a view showing the positions (hereafter referred to as of the "home positions") of the subtank 501 and the recording head 502 while no image is being recorded or a power source for the recording apparatus is off.

When the recording head 502 moves to its home position, shown in FIG. 26, the first and second members 524 and 525 rise and the second cap member 525 caps and covers a nozzle portion 502A of the recording head 502. At this time, the seal member 523 remains closing a through-hole 521A in the projecting member 513 and the ink intake port 501A, and an opening 529A in the suction pipe 529 aligns with and abuts against the opening 528A in the movable member 528 to close it.

Figure 27:
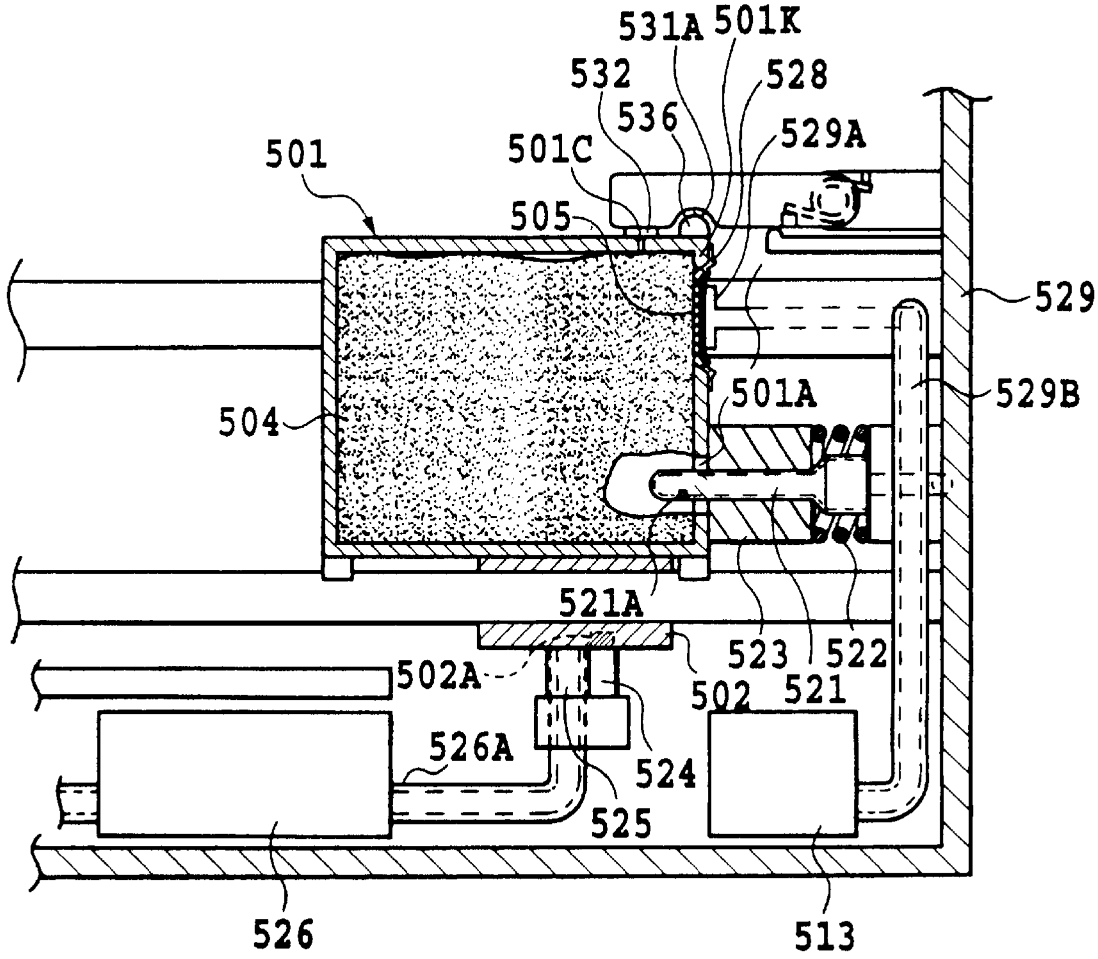
FIG. 27 is a sectional view of an integral part of the ink supplying device; the view shows how ink refilling is executed, and is useful in explaining the third embodiment.

The ink intake port 501A in the subtank 501 and the suction port 501K are thus closed, thereby preventing the ink in the subtank 501 from being thickened. At this time, the tip portion of the suction pipe 529 is in a locational relationship in which it presses and slightly collapses the movable member 528 leftward in the figure to close the opening 528A, thus ensuring that the subtank 501 can be closed despite a slight deviation in the stop position of the subtank 501. FIG. 25 shows the shape of the movable member 528 prior to the collapse. FIG. 26 shows the shape of the movable member 528 during the collapse. FIG. 27 shows the shape of the collapsed movable member 528.

While the ink intake port 501A in the subtank 501 and the suction port 501K are thus closed, the channel of the suction pump 513 may be closed in order to prevent the ink in the subtank 501 from, evaporating through the gas transmitting member 505, may be open while using a suction channel 528B long enough to hinder the evaporation, or may be slightly open so as not to facilitate the evaporation.

In the present invention, the locations of the gas transmitting member 505 in FIGS. 25 and 26, which are separate from the suction port 501K, are collectively defined as a "first position."

The recording head 502 at its home position, shown in FIG. 26, can be maintained in an appropriate ink-ejecting condition by means of a recovery process of causing it to discharge an amount of the ink which does not contribute to image recording. The recovery process includes introducing negative pressure generated by the suction pump 526 into the second cap member 525 to force the ink to be sucked and discharged from the ink ejecting port in the nozzle portion 502A of the recording head 502 or ejecting the ink from the ink ejection port in the nozzle portion 502A to an interior of the second cap member 525.

FIG. 27 shows how the ink is supplied to the subtank 501.

If the ink in the subtank 501 decreases to the extent that an ink supply is required, the subtank 501 and the recording head 502 move in the direction of the arrow A1 from their home positions, shown in FIG. 26, to their ink refilling positions, as shown in the drawing. Then, when the recording head 502 moves to its ink refilling position, the first and second cap members 524 and 525 rise and the first cap member 524 caps and blocks the nozzle portion 502A of the recording head 502, thus causing the cap member 524 to close the ink ejection port in the nozzle portion 502A. At this time, the seal member 523 remains closing the ink intake port 501A, and opens the through-hole 512A by moving relatively to the projecting member 521. The through-hole 521A is opened inside the subtank 501 to form an ink supplying system between the subtank 501 and a main tank (not shown). Further, the seal member 532 located at the tip of the arm member 531 closes the atmospheric-communication port 501C in the subtank 501, and the movable member 528 is further pushed toward the tip of the suction pipe 529 and is dented leftward up to a position where the gas transmitting member 505 comes into contact with the absorber 504, thereby forming an air sucking system between the suction port 501B and the suction pump 513 via the suction channel 529B.

The channel of the suction pump 513 is at least partly communication with the atmosphere so that the air in the suction channel 528B will not pressurize the interior of the subtank 501 when the movable 528 is further pushed toward the tip of the suction pipe 529. The position of the gas transmitting member 505 set at this time is defined as a "second position".

Under these conditions, the air in the subtank 501 is sucked by the suction pump 513 through the gas transmitting member 505, and the sucked air is discharged to an interior of the waste container (not shown) via the suction pipe 513. This sets the interior of the subtank 501 at negative pressure, which causes the ink in the main tank to be sucked to the interior of the subtank 501. The ink thus flowing in the subtank permeates through the ink absorber 504, and the level of the ink in the subtank 501 rises as the permeation proceeds. In this case, the rising speed of the level of the ink depends on the sucking force of the suction pump 513 and is thus set at an appropriate value depending on the amount of operation of the suction pipe 513. When the level of the ink reaches the gas transmitting member 505, the ink refilling is automatically stopped because the gas transmitting member 505 does not transmit liquids such as inks therethrough. Further, the refilling of the ink accommodating sections 501C, 501M, 501Y, and 501K is simultaneously started and is automatically sequentially stopped by the gas transmitting member 505 starting with the accommodating section filled with the ink earliest.

After such an ink refilling operation has been completed, when the subtank 501 and the recording head 502 are moved to their home positions shown in FIG. 2, or their recording operation positions shown in FIG. 1, the movable member 528 recovers its shape shown in FIGS. 1 and 2 due to its recovery force, with the gas transmitting member 505 returning to the first position.

When the gas transmitting member 505 is to be returned from the second position to the first position, the channel of the suction pump 513 is at least partly communication with the atmosphere so that the air in the suction channel 528B will not pressurize the interior of the subtank 501.

At the first position in FIGS. 25 and 26, the gas transmitting member 505 is separate from the absorber 504 and is thus prevented from contacting with the ink, even after the subtank 501 has been fully refilled with the tank. The gas transmitting member 505 is thus hindered from contacting with the ink over a long period, thereby making it possible to prevent the performance of the gas transmitting member 505 from being degraded.

In the present embodiment, the gas transmitting member 505 and the suction pump 513 are isolated from each other except in their home positions shown in FIG. 26 and except during the ink supply operation shown in FIG. 27.

FIG. 28 is a side view of FIG. 27. As shown in the drawing, the subtank 501 has the ink accommodating sections 501C, 501M, 501Y, and 501K formed therein for accommodating cyan, magenta, yellow, and black inks, respectively, and each having the ink intake port 501A, the suction port 501K, the atmospheric-communication port 501C, and the ink supplying port (not shown) to the nozzle portion 532A formed therein. In view of the frequency with which the black ink is used, the back ink accommodating section 501K is formed to be larger than the other accommodating sections. The nozzle portion 502A of the recording head 502 is provided for each ink color. The subtank 501 and the recording head 502 may be coupled together so as to constitute an ink jet cartridge or may each have its structure split so as to correspond to each color.

In this example, the openings 529A each formed for the corresponding one of the ink accommodating sections 501C, 501M, 501Y, and 501K are collected at a collecting section 529C to form a single suction channel 529B, which is connected to the common suction pipe 513.

According to the ink jet recording apparatus of the third embodiment of the present invention, which is configured as described above, the ink supplying method implemented using this ink jet recording apparatus includes negative-pressure introducing means such as the suction pump 513, gas-liquid separating means such as the gas transmitting member 505 which is provided in a negative-pressure introducing path such as the suction pipe 519 which is capable of introducing a negative pressure into the subtank 501 as an ink tank, the gas-liquid separating means transmitting gases therethrough while not transmitting inks therethrough, and isolation means such as the movable member 528 which is provided in a middle site of the negative-pressure introducing path located between the suction pump 513 as the negative-pressure introducing means and the gas transmitting member 505 as the gas-liquid separating means, the isolation means being capable of isolating the middle site, in which when the subtank 501 moves to a predetermined ink supplying position and a predetermined home position, the middle site of the negative-pressure introducing path such as the suction pipe 529 is connected, in which when the subtank 501 moves to the ink supplying position, the gas transmitting member 505 as the gas-liquid separating means is located at the second position and the negative pressure is introduced into the ink tank through the suction pipe 529 as the negative-pressure introducing path, so that the ink is supplied to an interior of the subtank 501 using the negative pressure in the subtank 501, wherein when or after the ink comes into contact with the gas transmitting member 505 as the gas-liquid separating means, the gas transmitting member 505 as the gas-liquid separating means stops introducing the negative pressure into the subtank 501, wherein when the subtank 501 leaves the ink supplying position and the home position, the middle site of the suction pipe 529 as the negative-pressure introducing path is isolated, and wherein when the subtank 501 leaves the ink supplying position, the gas transmitting member 505 as the gas-liquid separating means is located at the first position. Accordingly, the subtank 501 can be reliably refilled with the ink using the simple configuration, thereby reducing the weight and costs of the recording apparatus and making the recording apparatus more reliable.

Fourth Embodiment

Figure 29:
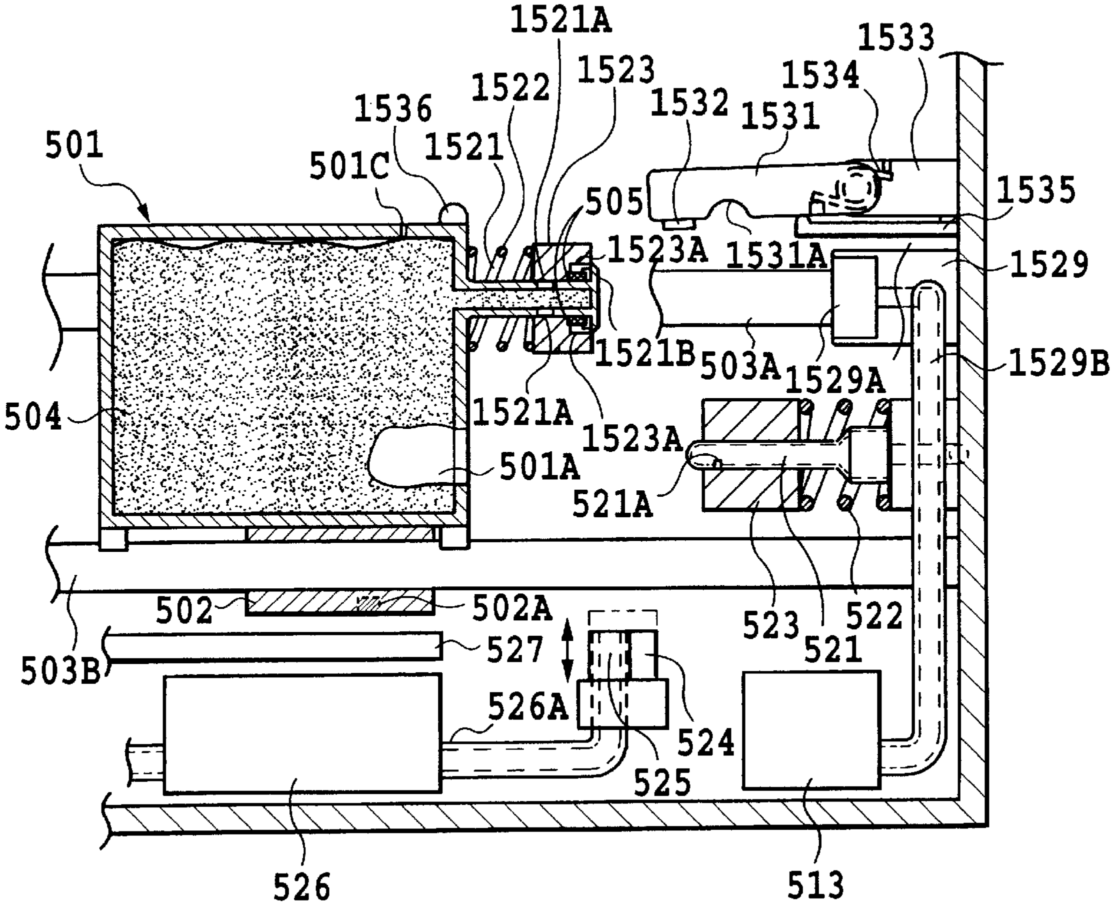
FIG. 29 is a sectional view of an integral part of the present invention; the view shows a recording operation and is useful in explaining a fourth embodiment.
Figure 30:
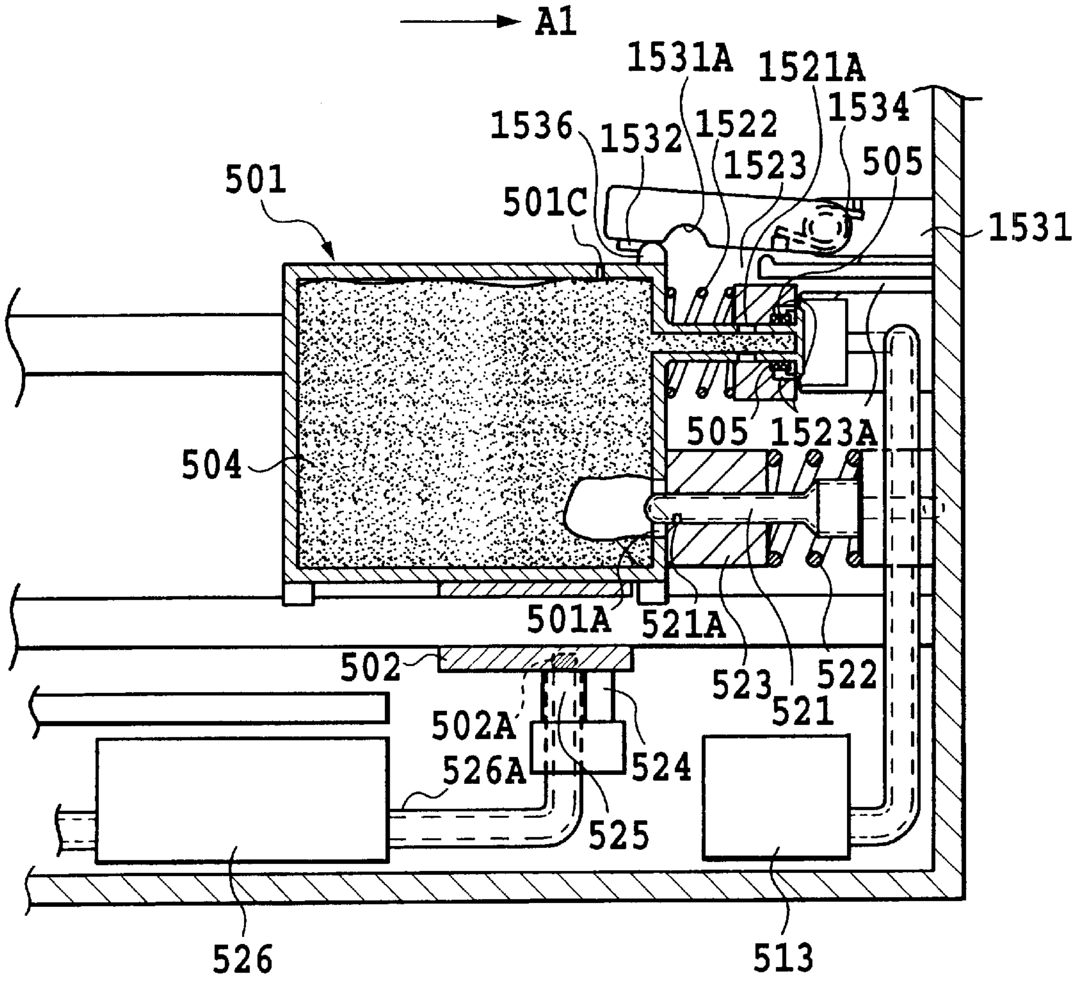
FIG. 30 is a sectional view of an integral part of the present invention; the view shows a home operation and is useful in explaining the fourth embodiment.
Figure 31:
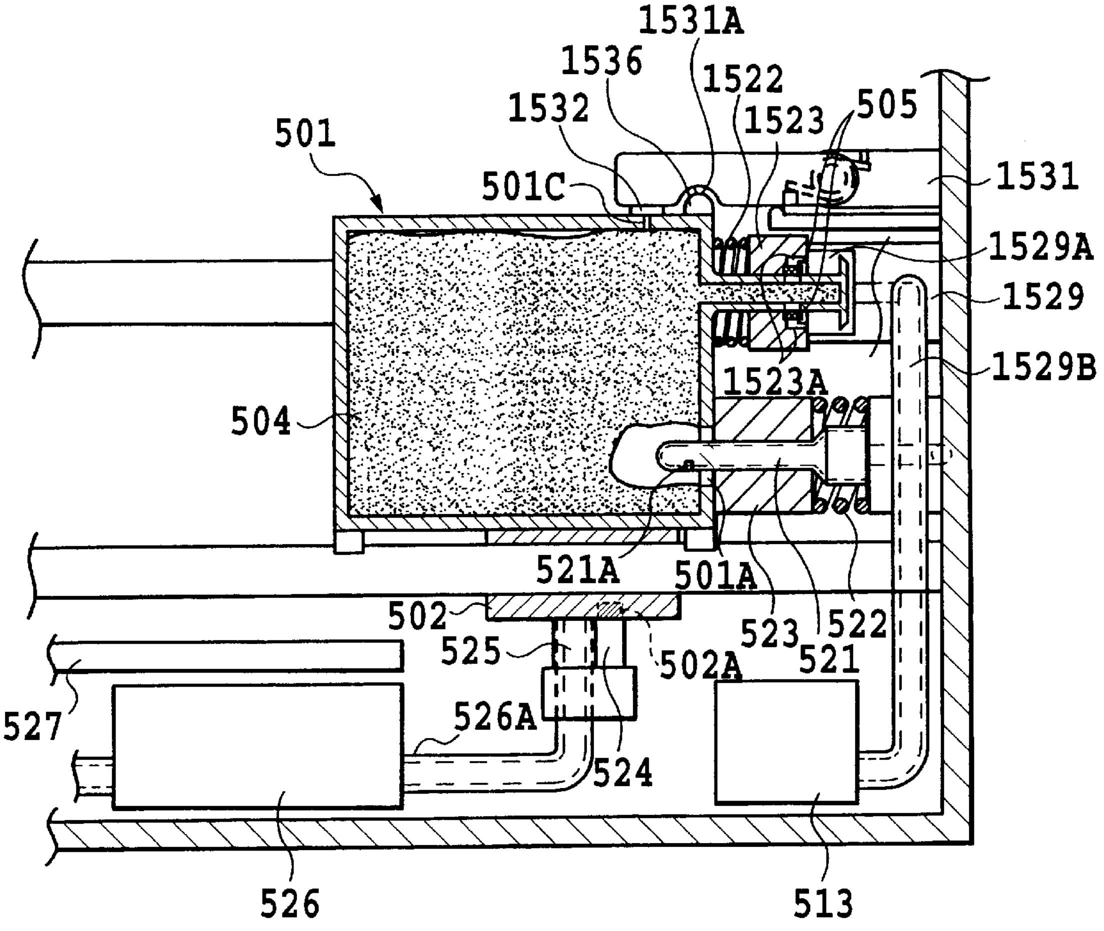
FIG. 31 is a sectional view of an integral part of the present invention; the view shows how ink refilling is executed, and is useful in explaining the fourth embodiment.

FIGS. 29 to 31 are views useful in explaining a fourth embodiment of the ink supplying device of the ink jet recording apparatus of the present invention. Parts similar to those in the third embodiment are denoted by the same reference numerals, and their detailed description is omitted.

First, FIG. 29 is a view showing how an image is recorded on the recorded medium (not shown).

As shown in the drawing, the subtank 501 has a hollow projecting member 1521 formed on one side wall surface and having a cylindrical cross section, the projecting member 1521 having a locking section 1521B at one end thereof and blocked at this end. The projecting member 1521 has a block-shaped seal member 1523 fitted around an outer periphery thereof so as to slip freely and which is urged rightward in the figure by means of a spring 1512. The projecting member 1521 has a through-hole 1521A formed near a tip portion thereof and which is opened and closed by the seal member 1523. Further, the seal member 1523 has the gas transmitting member 505 secured at two locations of an inner peripheral portion thereof by means of thermal welding, an adhesive, or the like so as to cover a channel 1523A. That is, the seal member 1523 has a penetrating aperture drilled in the center thereof and in which the projecting member 1521 is fitted, the penetrating aperture having two cavities formed in an inner periphery portion thereof and located opposite to each other in the direction of the diameter thereof. Channels 1523A extend in the horizontal direction from these cavities in a bending fashion, and the gas transmitting members 505 are attached to the corresponding cavities in such a manner as to block and cover the channels 1523A.

During printing, that is, during recording, the seal member 1523 is urged by the spring 1522 up to a position where it abuts against the locking section 1521B at the end of the projecting member 1521, so that the through-hole 1521A is closed by the seal member 1523. At this time, the gas transmitting member 505 is not located opposite to the through-hole 1521A; it deviates from the location of the through-hole 1521A.

A seal member 1532 is also provided on the bottom surface of a tip portion of the arm member 1531 to enable the atmospheric-communication port 501C to be blocked. A proximal end portion of the arm member 1531 is journaled to a tip portion of a support member 1533 in the apparatus main body by means of an appropriate pivotal pin so as to be rotationally movable in the vertical direction; the proximal end portion is also urged downward by a spring 1534. Furthermore, the apparatus main body has a stopper member 1535 for regulating the lower movement position of the arm member 1531. Additionally, the subtank 501 has a projecting portion 1536 for moving the arm member 1531 in the vertical direction depending on the movement position of the subtank 501. Moreover, the arm member 1531 has a recess portion 1531A formed therein for holding the subtank 501 when the projecting portion 1536 slips into the recess portion and is locked therein.

The apparatus main body also has a suction pipe 1529 having one end as an opening 1529A and the other end connected to the suction pump 513 via the suction channel 1529B.

FIG. 30 is a view showing that the subtank 501 and the recording head 502 are at their home positions.

As shown in the drawing, also at the home position, the through-hole 1521A is closed by the seal member 1523 and the ink intake port 501A is also closed by the seal member 523, thus preventing the ink in the subtank 501 from being thickened, as in FIG. 29. At this time, the gas transmitting member 505 is not located opposite to the through-hole 1521A.

The position of the gas transmitting member 505 shown in FIGS. 29 and 30 is defined as a "first position", which is similar to that in the third embodiment.

FIG. 31 shows how the ink is supplied to the subtank 501.

As shown in the drawing, if the ink in the subtank 501 decreases to the extent that an ink supply is required, the subtank 501 and the recording head 502 move in the direction of the arrow A1 from their home positions, shown in FIG. 30, to their ink refilling positions, as shown in FIG. 31. Then, when the recording head 502 moves to its ink refilling position, the first and second cap members 524 and 525 rise and the first cap member 524 caps and blocks the nozzle portion 502A of the recording head 502, thus causing the cap member 524 to close the ink ejection port in the nozzle portion 502A. At this time, the seal member 1523 remains closing the ink intake port 501A, and opens the through-hole 521A by moving relatively to the projecting member 521. The through-hole 521A is opened inside the subtank 501 to form an ink supplying system between the subtank 501 and a main tank (not shown). Further, the seal member 1532 closes the atmospheric-communication port 501C in the subtank 501, and the seal member 1523 moves relatively to the projecting member 512 to locate the gas transmitting member 505 opposite to the through-hole 1523A, thereby forming an air sucking system between the through-hole 1523A and the suction pump 513 via the suction channel 1529B. The position of gas transmitting member 505 is defined as a "second position".

The ink refilling operation performed under these conditions is exactly the same as that in Embodiment 1, so its detailed description is omitted.

Further, after the ink refilling operation has been completed, when the subtank 501 and the recording head 502 are moved to their home positions shown in FIG. 30 or their recording operation positions shown in FIG. 29, the seal member 1523 recovers its shape shown in FIGS. 29 and 30 due to the effects of the spring 1522, with the gas transmitting member 505 returning to the first position.

At the first position shown in FIGS. 29 and 30, the gas transmitting member 505 is prevented from contacting with the ink even after the subtank 501 has been fully refilled with the ink. The gas transmitting member 505 is thus hindered from contacting with the ink over a long period, thereby making it possible to prevent the performance of the gas transmitting member 505 from being degraded.

In the present embodiment, the gas transmitting member 505 and the suction pump 513 are isolated from each other except during an ink supply in FIG. 31 because the gas transmitting member 505 is separated from the opening 1529A in the suction pipe 1529.

Fifth Embodiment

Figure 32:
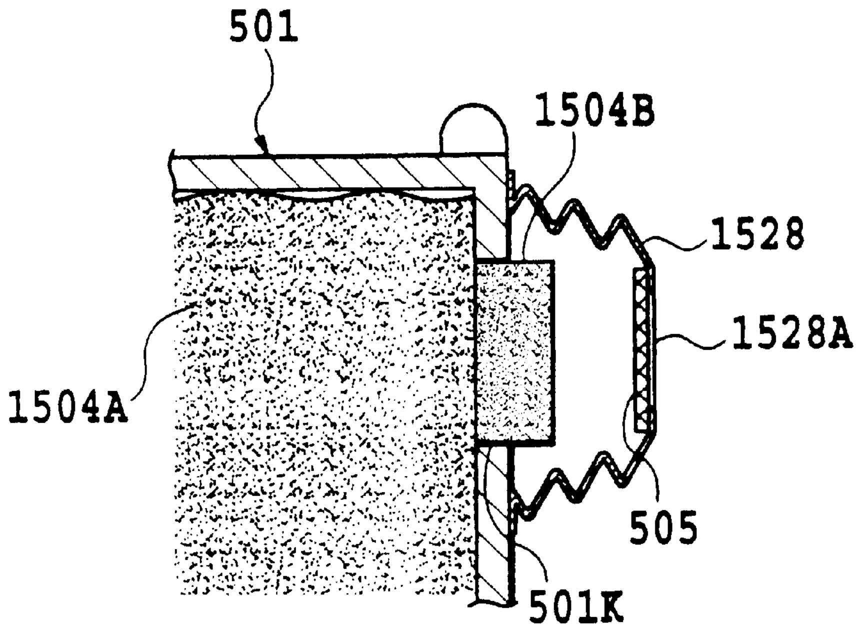
FIG. 32 is a sectional view of an integral part of a fifth embodiment of the present invention, showing how a bellows-shaped movable member is inflated.
Figure 33:
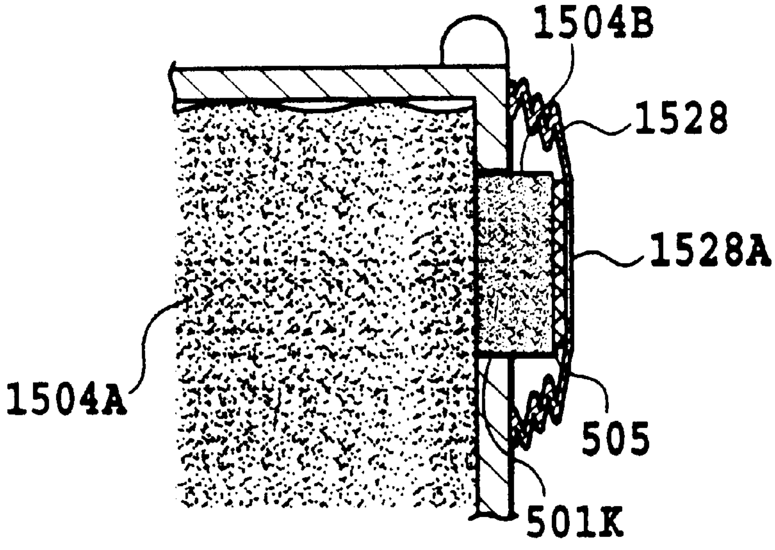
FIG. 33 is a sectional view of an integral part of FIG. 32, showing how the bellows-shaped movable member is contracted.

FIGS. 32 and 33 are views useful in explaining a fifth embodiment of the ink jet recording apparatus of the present invention.

In the fifth embodiment, the movable member 1528 is in the form of stepped thin disks of different diameters, but may be formed like bellows as shown in the drawings.

FIGS. 32 and 33 shows the shape of the movable member 1528 at the first and second positions, respectively, of the gas transmitting member 505, with the suction pipe in the recording apparatus omitted.

The movable member 1528 is formed of an elastic material such as rubber or an elastomer, shaped like bellows, and secured to a wall surface of the subtank 501; the movable member 1528 has the gas transmitting member 505 fixed thereto by means of thermal welding, an adhesive, or the like so as to cover the opening 1528A. The subtank 501 internally has an absorber 1504A for retaining the ink, and further has an absorber 1504B pressed in its suction port 501B in pressure contact with the absorber 1504A.

At the second position shown in FIG. 33, the gas transmitting member 505 is in contact with the absorber 1504B. The air inside the subtank 501 is thus sucked by the suction pump (not shown) via the gas transmitting member 505, and the ink is supplied from the main tank (not shown) to the subtank 501.

In the present embodiment, as in the fourth embodiment, once the ink reaches the gas transmitting member 505, the ink supply is stopped and the subtank 501 is then moved to its home position or recording operation position to cause the bellows-like movable member 1528 to return, due to the recovery force thereof, to the first position shown in FIG. 32. Of course, at this first position, even immediately after the tank has become full of the ink, the gas transmitting member 505 does not contact with the ink, thereby making it possible to preferably prevent the degradation of the performance.

Other Embodiments

In the fifth embodiment, the gas transmitting member 505 provided in the subtank 501 may have different characteristics or shapes depending on the characteristics of the ink or the amount of ink accommodated.

For example, a porous body having varying characteristics or shape can be provided as the gas transmitting member 505; the varying characteristics or shape of the porous body are similar to the level of the negative pressure exerted in the subtank 501 which varies depending on the amount of ink accommodated in the subtank 501 with the gas transmitting member 505 provided therein. Specifically, the gas transmitting member 505 may comprise a porous body of a varying porous diameter or thickness, or the gas transmitting member 505 may have a varying occupying area in a vent passage and thus have a varying size depending on this occupying area. The occupying area of the gas transmitting member 505 can be varied by providing a displaceable cover that covers a surface of the gas transmitting member 505.

By thus varying the value of the negative pressure in the subtank 501, the speed at which the subtank 501 is refilled with the ink can be adjusted. For a subtank 501 for accommodating an ink having high flow resistance and a subtank 501 capable of accommodating a large amount of ink, a plurality of subtanks 501 can be efficiently refilled with the ink by selecting such a gas transmitting member 505 that increases the value of the negative pressure in the subtank 501.

In this manner, the characteristics of the gas transmitting member 505 can be optimally set using as parameters the porous diameter and thickness of the gas transmitting member 505, the opening area of the vent passage, or the like. Further, the gas transmitting member 505 itself may have varying physical characteristics (such as a varying degree of venting).

Furthermore, the gas transmitting member has only to have the gas-liquid separating function and may be composed of various materials depending on the type of the ink or the operation form. The gas transmitting member may be, for example, a gas transmitting film composed of polytetrafluoroethylene or a similar porous resin material, or it may be composed of porcelain, unglazed pottery, ceramic, or a similar porous material. The gas transmitting member may alternatively comprise a mechanically configured valve which is opened to transmit gases therethrough and which is closed to prevent liquids from passing therethrough. Furthermore, such a gas transmitting member can be more effectively subjected to a oil repelling process by applying thereto or coating thereon an appropriate oil repellent agent such as a fluorine compound, for example.

Further, the ink tank of the present invention is not limited to the one moved with the recording head of the serial-scan-based recording apparatus but may be provided at a fixed position. Alternatively, it may be permanently connected to a refilling ink tank such as the subtank via a tube.

The present invention is further applicable to a form in which the ink tank has a main tank permanently connected thereto via a tube to refill the ink tank with the ink. Additionally, the present invention is applicable not only to the ink tank moved with the recording head but also to a form in which the ink tank is provided at a fixed position.

Moreover, the present invention utilizes the functions of the gas transmitting member to automatically stop the ink supply or refilling, and includes the closing means for opening and closing the ink supply port, the closing means being composed of an elastic member, the deformation means for deforming the closing means, and the urging means for urging the deformation means. Consequently, the joint device for refilling the ink tank with the ink can be reliably implemented using low power despite its simple configuration, thereby reducing the size and weight of the recording apparatus and making it more reliable.

Further, since the ink is sucked and discharged from the recording head connected to the ink tank before the ink is sucked and supplied to the interior of the ink tank, ink meniscus can be formed at the ink ejecting port in the recording head to ensure the subsequent ink suction and refilling.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A joint device for connecting and separating an ink tank capable of taking in an ink through an ink intake port to and from an ink channel to take the ink from a refilling tank into the ink tank, said joint device comprising:

a supply pipe having an ink supply port disposed therein;

closing means composed of an elastic member, for opening and closing the ink supply port, said closing means comprising a sucker-shaped portion provided on a tip end side of said supply pipe so as to cover the ink intake port when connected with the ink tank;

deformation means for deforming said sucker-shaped portion; and urging means for urging said deformation means;

wherein said deformation means is moved by said urging means to connect said sucker-shaped portion with the ink tank and said sucker-shaped portion is deformed to close the ink intake port.

2. The joint device according to claim 1, wherein one or more projections are formed near the ink intake port so that the sucker-shaped portion is deformed in such a manner as to rub against the one or more projections.

3. An inkjet recording apparatus having a joint device for connecting and separating an ink tank capable of taking in an ink through an ink intake port to and from an ink channel to take the ink from a refilling tank into the ink tank, said ink jet recording apparatus comprising:

a supply pipe having an ink supply port disposed therein;

closing means comprising an elastic member, for opening and closing the ink supply port, said closing means comprising a sucker-shaped portion provided on a tip end side of said supply pipe so as to cover the ink intake port when connected with the ink tank;

deformation means for deforming said sucker-shaped portion; and urging means for urging said deformation means;

wherein said deformation means is moved by said urging means to connect said sucker-shaped portion with the ink tank and said sucker-shaped portion is deformed to close the ink intake port.

4. The ink jet recording apparatus according to claim 3, wherein one or more projections are formed near the ink intake port so that the sucker-shaped portion is deformed in such a manner as to rub against the one or more projections.

5. An ink jet recording apparatus according to claim 3, further comprising recording means for recording an image on a recording medium using an ink jet recording head which ejects ink supplied from said ink tank, said ink jet recording apparatus further comprising:

negative-pressure introducing means for introducing negative pressure into the ink tank;

ink supplying means for supplying the ink to an interior of the ink tank using negative pressure in the ink tank;

gas-liquid separating means provided in a negative-pressure introducing path located between the ink tank and said negative-pressure introducing means, for transmitting gases therethrough while not transmitting the ink therethrough; and isolation means for separating a middle site of the negative-pressure introducing path located between said gas-liquid separating means and said negative-pressure introducing means from the ink tank.

6. The ink jet recording apparatus according to claim 5, wherein said gas-liquid separating means is supported by the ink tank and is movable between at least two positions including a first position used while the ink is not being supplied and a second position used while supplying the ink.

7. The ink jet recording apparatus according to claim 5, wherein said isolation means has a connection portion to which the middle site of the negative-pressure introducing path is separably connected.

8. The ink jet recording apparatus according to claim 5, said ink jet recording apparatus further comprising movement means for moving the ink tank so that when the ink tank moves to a predetermined ink supplying position and a predetermined home position, said isolation means connects the middle site of the negative-pressure introducing path to the ink tank and so that when the ink tank moves away from the ink supplying position and the home position, said isolation means isolates the middle site of the negative-pressure introducing path from the ink tank.

9. The ink jet recording apparatus according to claim 8, wherein said movement means moves the ink jet recording head together with the ink tank.

10. The ink jet recording apparatus according to claim 5, said ink jet recording apparatus further comprising movement means for moving the ink tank so that when the ink tank moves to a predetermined ink supplying position, said isolation means connects the middle site of the negative-pressure introducing path to the ink tank and so that when the ink tank moves away from the ink supplying position, said isolation means isolates the middle site of the negative-pressure introducing path from the ink tank.

11. The ink jet recording apparatus according to claim 5, wherein when the ink tank moves away from an ink tank supply position, said gas-liquid separating means is driven to a first position, and when said ink tank moves to the ink tank supply position, said gas-liquid separating means is driven to a second position.

12. The ink jet recording apparatus according to claim 5, wherein while said gas-liquid separating means is being driven between a first and a second position, a part of the negative-pressure introducing path is in communication with the atmosphere.

13. The ink jet recording apparatus according to claim 5, wherein said gas-liquid separating means is a gas-transmitting film composed of polytetrafluoroethylene or a similar porous resin material.

14. The ink jet recording, apparatus according to claim 5, wherein said gas-liquid separating means is a gas-transmitting film composed of porcelain, unglazed pottery, ceramic, or a similar porous material.

15. The ink jet recording apparatus according to claim 5, wherein said gas-liquid separating means undergoes an oil-repelling process.

16. The ink jet recording apparatus according to claim 5, wherein the ink jet recording head has an electrothermal converter for generating thermal energy as energy required to eject the ink.

17. An ink jet recording apparatus having a joint device for connecting and separating an ink tank capable of taking in an ink through an ink intake port to and from an ink channel to take the ink from a refilling tank into the ink tank, said ink jet recording apparatus comprising:

a supply pipe having an ink supply port disposed therein;

closing means comprising an elastic member, for opening and closing the ink supply port;

deformation means for deforming said closing means; and urging means for urging said deformation means, wherein said deformation means operates during a connection operation in such a manner as to relieve the deformation of said closing means and then slide over said supply pipe;

wherein the ink tank takes in the ink from the refilling tank by means of negative pressure introduced into the ink tank through a suction port therein, and wherein the suction port has gas-liquid separating means for transmitting gases therethrough while not transmitting the ink therethrough.

18. The ink jet recording apparatus according to claim 17, wherein the gas-liquid separating means is selected from polytetrafluoroethylene and similar porous resin materials which transmit gases therethrough while not transmitting liquids therethrough.

* * * * *